US012775908B1

(12) United States Patent
Tewari et al.

(10) Patent No.: US 12,775,908 B1
(45) Date of Patent: Oct. 27, 2026

(54) MACHINE LEARNING-BASED SCORING METHOD FOR CONTROLLING ITEM STOWING OR PICKING

(71) Applicant: Amazon Technologies, Inc., Seattle, WA (US)

(72) Inventors: Ashutosh Tewari, Clinton, NJ (US); Kimberly Sue Houchens, Seattle, WA (US); Chase John Tucker, Puyallup, WA (US); Austin Rhymer, Nashville, TN (US)

(73) Assignee: Amazon Technologies, Inc., Seattle, WA (US)

( * ) Notice: Subject to any disclaimer, the term of this patent is extended or adjusted under 35 U.S.C. 154(b) by 544 days.

(21) Appl. No.: 18/082,426

(22) Filed: Dec. 15, 2022

(51) Int. Cl.
*G06Q 10/087* (2023.01)
*G06N 20/00* (2019.01)

(52) U.S. Cl.
CPC .......... *G06Q 10/087* (2013.01); *G06N 20/00* (2019.01)

(58) Field of Classification Search
CPC ............................ G06Q 10/087; G06N 20/00
See application file for complete search history.

(56) References Cited

U.S. PATENT DOCUMENTS

| | | | | |
|---|---|---|---|---|
| 10,504,061 | B1 * | 12/2019 | Shi | G06Q 10/0838 |
| 12,390,931 | B2 * | 8/2025 | Wang | G06T 7/11 |
| 2020/0387864 | A1 * | 12/2020 | Shi | G06Q 10/0838 |
| 2021/0090193 | A1 * | 3/2021 | Cui | G06Q 10/08 |
| 2022/0254338 | A1 * | 8/2022 | Gruber | G06F 40/40 |
| 2022/0358443 | A1 * | 11/2022 | Deng | G06Q 10/0875 |
| 2023/0120318 | A1 * | 4/2023 | Marinkovich | G06Q 40/06 382/155 |
| 2023/0196229 | A1 * | 6/2023 | Cella | H04L 67/12 705/7.17 |

* cited by examiner

*Primary Examiner* — Fahd A Obeid
*Assistant Examiner* — Jessica E Sullivan
(74) *Attorney, Agent, or Firm* — Kilpatrick Townsend & Stockton LLP

(57) ABSTRACT

Implementing machine learning generated item scores to guide the handling of items is described herein. The method comprising receiving, from a first user device, first data indicating that a first item and a second item are to be arranged in a first container; determining for the first item a first item score and for the second item a second item score, the first item score and the second item score being generated by a machine learning model and indicating that the first item is to be arranged in a first container prior to the second item being arranged in the first container; and causing, based at least in part on the first item score and the second item score, the first item to be arranged in the first container prior to the second item.

20 Claims, 17 Drawing Sheets

MACHINE LEARNING-BASED SCORING METHOD FOR CONTROLLING ITEM STOWING OR PICKING

BACKGROUND

Storage facilities catering to order fulfillment, such as online grocery store fulfillment centers, often process thousands of orders a day while housing large inventories to meet the demands. Fulfilling an order can involve resources, including automated resources such as robots, and constraints in order to meet various objectives. One such constraint is the pack-sequence of the items in a container, for example in a grocery bag. This sequence is important to ensure high-quality bagging, marked by improved bag-utilization and reduced item-damage during handling and transit to a customer's home. Additionally, the use of resources needs to be optimized—in the light of a prescribed packing sequence—such that the resources are appropriately utilized during the fulfillment process.

BRIEF DESCRIPTION OF THE DRAWINGS

Various embodiments in accordance with the present disclosure will be described with reference to the drawings, in which.

DETAILED DESCRIPTION

Figure 1:
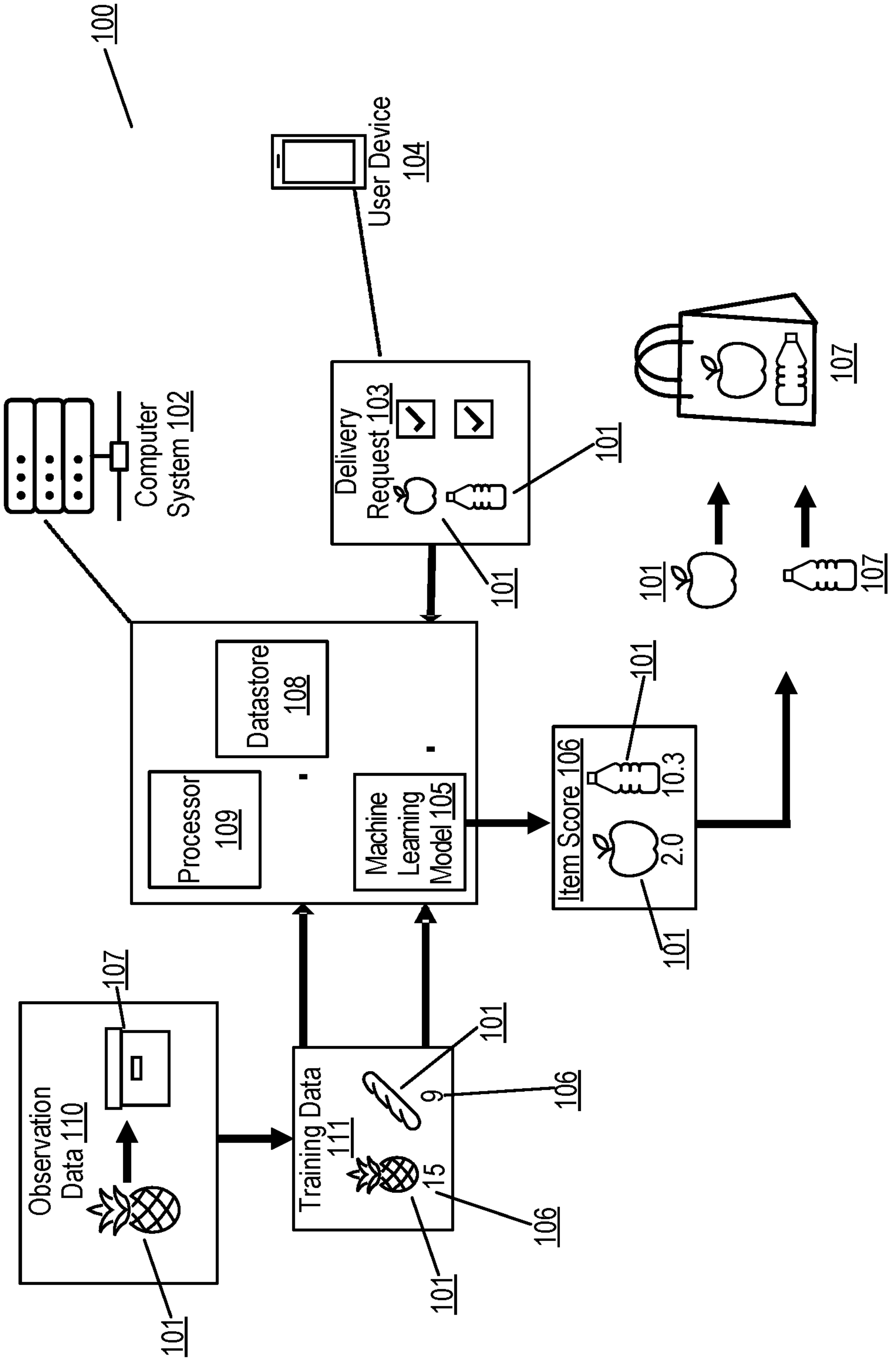
FIG. 1 illustrates an example of a general process for arranging items in a container based on machine learning generated item scores according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, implementing a scoring framework to improve packing quality and resource utilization related to the handling and the arrangement of items. As used herein, "arranging" items represent placing items in a container without the need to re-arrange the items once they are placed in the container. Such arranging can be equivalent to "placing" or "bagging" the items. In an example, a scoring method to determine an optimal packing sequence is described, with application to both automatic and manual grocery fulfillment centers. Specifically, features herein are directed to the implementation of a machine learning model to generate item scores used to inform the handling of the items associated with the item scores. One or more resources, including automated resources such as robots, can be deployed to stow the items in one or more storage locations, to pick the items from the one or more storage locations, and/or to arrange the items in one or more containers. By using the machine learning model-based item scores, utilization of such resource(s) can be improved as well as the overall quality of containers with arranged items.

Techniques described herein include, collecting data indicating the sequence of arranging items in a container (e.g., to fulfill delivery requests of a customer order). A score for an item can be generated using the data conveying the sequence of item arrangement. For example, a process can be executed on the data to determine the sequence in which the item was arranged in the container. The score can determine the ranking of the item relative to the other items in regard to arranging the items in the container (e.g., the item having a higher score than another item indicates that the item is arranged in the container prior to the other item). The techniques can also involve storing the generated score for each ranked item in a datastore, where the score is associated with an item identifier of the ranked item. Such stored data can be used as training data. In particular, a machine learning model can be trained to generate item scores based at least in part on the scores stored in the datastore. Thereafter, multiple items may need to be arranged. Item scores for these items may be determined. In particular, the item scores may be pre-generated by the machine learning model or may be generated on the fly upon input to the machine learning model about these items. The item scores indicate the sequence to arrange the items in a container and such items can be arranged in the container according to the sequence (e.g., by being placed in the container according to the sequence, and without re-arranging the items placed in the container). Different uses of the item scores can be supported and correspond to different packing approaches. In one example, the items are presented to a resource (e.g., fetched and/or picked and moved to a workstation) according to the sequence, where an item having a higher score relative to another item is presented to the resource and placed in the container by the resource prior to the presentation and placement of the other item. In another example, the different items can be presented simultaneously to a resource and the resource can be instructed to arrange the items in the container according to the sequence. In yet another example, a resource can be instructed to retrieve the items from different storage locations according to the sequence, whereby the resource can retrieve from a storage location and place a higher scoring item in the container prior to retrieving from another storage location and placing a lower scoring item in the container.

To illustrate, consider an order fulfillment center including an inventory of items and packing stations or carts to individually organize items in containers to fulfill customer orders. Resources can be observed retrieving items from storage locations and arranging such items in containers. The data can indicate the sequence one or more resources arrange items in a container. The data can also include instances wherein the items in the container are rearranged. Then, based at least in part on the collected data, the items handled by the resources can be scored. For example, a first item arranged in a container prior to a second item can have a first score that is greater than that of the second item. The scores can then be used to train a machine learning model to generate item scores for any item in an inventory. The item scores can be stored in a data store in associated with item identifiers. Upon receiving a new order, the items of the order are identified and the item identifiers are used in a look-up of the data store to retrieve the items scores. Then, based at least in part on the assigned item scores, a sequence can be determined for arranging the items in a container. The items of the order can be retrieved from storage locations according to the sequence, such that they are arranged in a container as they are being retrieved according to the sequence. Alternatively, the items can be retrieved from the storage locations (not necessarily according to the sequence) and presented to a workstation according to the sequence, whereby a resource at the workstation places the items in the container as they are presented. In this case, because the items are presented according to the sequence, the items are then placed in the container according to the sequence too. Thus, respective to the particular order, the items can be optimally arranged in a container for the purpose of fulfilling delivery requests and reducing the risk of damage to the items.

Embodiments of the present disclosure may provide technical improvements over conventional systems. For example, the techniques disclosed herein can be used in a storage facility environment (e.g., distribution centers, warehouses, grocery fulfillment centers, or other facilities or combinations of facilities for performing one or more tasks related to item handling for order fulfillment) and may allow for improved resource utilization and throughput by optimizing the manner in which items are arranged in containers. Conventional packing techniques, in the absence of a scoring method, rely on human workers to arrange items in containers to fulfill orders, which limits the speed at which the orders may be fulfilled and increases the likelihood of mistakes during the packing process requiring frequent bag rearrangements. In contrast herein, by using machine learning to generate and assign unique scores to items in an inventory, an optimum sequence for arranging items of a specific order can be quickly determined. Such sequences can be presented as set of instructions (e.g., on user interfaces) and can be used to plan and/or control the use of resources (e.g., robots, associates) such that items can be retrieved according to the sequences, presented to resources according to sequences, and/or ultimately arranged in containers according to the sequences.

Various embodiments are described herein by using the illustrative use case of a resource using generated item scores to arrange items in a container. A resource can be located at a workstation at which items are arranged in containers. Although the resource can provide manual labor, the embodiments of the present disclosure are not limited to manual labor and/or to using item scores at workstations. In particular, the use of automated resources at or around the workstation is possible. For instance, the generated item scores may guide the retrieval of items from an inventory, the presentation of items to a resource at the workstation, as well as the arrangement of items in containers. Additionally, or alternatively, the item scores may be implemented in a partially or completely automated environment to guide mobile robots to efficiently execute order fulfillment tasks.

Furthermore, various embodiments of the present disclosure are illustrated in connection with arranging items in a container based on item scores. However, the embodiments are not limited as such and can similarly apply to other item handling operations including, for instance, stowing items in one or more storage locations and/or picking items from one or more storage locations. In an example, an item score can be generated by a machine learning model for an item, where the machine learning model is trained using data collected for item stowing operations. The item score can induce a ranking of stowing the items relative to other items. As such, when a resource (e.g., a robot) is instructed to stow the item and another item, the instructions can indicate the item score as well as the item score of the other item. The resource can then execute a stow process, whereby the two items are stored in the sequence indicated by their item scores. In another example, an item score can be generated by a machine learning model for an item, where the machine learning model is trained using data collected for item picking operations. The item score can induce a ranking of picking the items relative to other items. As such, when a resource (e.g., a robot) is instructed to pick the item and another item, the instructions can indicate the item score as well as the item score of the other item. The resource can then execute a pick process, whereby the two items are picked and arranged in the sequence indicated by their item scores.

In a first illustrative use case, a computer system may receive an order for items stored in a storage facility and item scores for the items may be generated on the fly or pre-generated using a machine learning model. These item scores may then be used to determine a particular sequence to retrieve said items from an inventory of items in the storage facility. Such that, based at least in part on the item scores associated with the items, a resource can be instructed according to the particular sequence to retrieve the items from the inventory before bagging in containers.

In a second illustrative use case, a computer system receives an order for items stored in a storage facility. The item scores can be generated (on the fly or pre-generated), using a machine learning model, for each item of an order. Then, based in part on the item stores, a resource may be instructed to arrange the items in a container in an optimal sequence, whereby the items may be delivered to the resource not necessarily according to the sequence.

FIG. 1 illustrates an example process 100 for arranging items 101 in a container 107 based on item scores 106 generated using machine learning techniques, according to an embodiment of the present disclosure. As illustrated, the example process 100 may be implemented by a system that may include a computer system 102, a user device 104, and a datastore 108.

The computer system 102 may include hardware (e.g., a set of hardware servers) or virtualized components by hardware (e.g., a set of virtualized servers) configured to perform various operations of the process 100. Generally, the computer system 102 may include one or more processors 109 and one or more memory 108 storing instructions that, upon execution by the one or more processors 109, configure the computer system 102 to perform the operations.

The computer system 102 may be used to receive data 110 indicating a sequence of arranging items 101 in a container. In some embodiments, the data 110 is collected from observing resources arranging items 101 in containers 107 to fulfill delivery requests 103, as further illustrated in FIG. 2A. In an example, the data 110 can be automatically generated. For example, a camera 201 may be installed in a cart 202 where items 101 are packed in containers 107. Video and image processing techniques can be applied to the recorded data (e.g., image frames forming a video) generated by the camera 201. These techniques can involve object detection algorithms to detect and identify items 101 and container 107 in images and to track these items 101 as they are being placed in containers 107. The techniques can also involve event detection, for example when items 101 are rearranged in container 107. As such, the output of the event and object detection algorithms can identify items 101 and the preferred sequence in which they were arranged. In another example, the data 110 can be manually generated. In particular, the video data can be manually annotated to identify items 101 and their sequence of bagging (with or without rearrangements). In another example, a virtual bagging system may be used to obtain data 110 indicating a sequence of arranging items 101 in a container, as further illustrated in FIG. 2B.

Based at least in part on the data 110 received, the computer system 102 can generate scores 106 for items 101, where the scores 106 induces the ranking for arrangement of an item 101 in a container 107 relative to other items 101 arranged in the container 107. The computer system 102 can reconcile the score 106 of items 101 across different containers 107. For example, if item "A" was put before item "B" when the two items "A" and "B" were arranged in a first container, and if item "B" was put before item "C" when the two items "B" and "C" were arranged in a second container, then item "A" is set to have a score larger than that of item "C". However, if item "B" was put after item "C," additional observations may be needed to determine the relative scores of items "A" and "C." These scores 106 may be stored in the datastore 108 for subsequent use or used to guide the arrangement of the associated items 101 in a container 107 for delivery. Furthermore, the scores 106 may subsequently be used to train a machine learning model to generate item scores 106 for any item 101 presented.

As depicted in FIG. 1, the computer system 102 may receive (e.g., from the user device 104) an order 103 requesting delivery for various items 101. Upon receipt of the order 103, the computer system 102 can generate an input to the machine learning model 105. The input can include any or a combination of item features 701 (e.g., item descriptions and properties available from a datastore that stores information about items available for ordering) and/or item identifiers 301. The output of the machine learning model 105 can include item scores 106 for each item 101 in the order 103, where an item score 106 induces a ranking of an item 101 in the order 103 with respect to the other items 101 in the order 103. Additionally, or alternatively, prior to receipt of the order 103, the computer system 102 can generate an input about each item 101 described in the datastore 108 of item information and can receive the output of the machine learning model 105. The output can indicate the item score 106 for the item 101. The computer system 102 can store such items scores 106 in the datastore 108. Upon receiving the order 103, the computer system 102 can then lookup the datastore 108 using item identifiers 301 of the ordered items 101 to then determine the corresponding item scores 106. Then, based at least in part on the item scores 106, the items 101 may be arranged in one or more containers 107 in an optimal sequence.

Some or all of the operations of process 100 (or any other processes described herein, or variations, and/or combinations thereof) may be performed under the control of one or more computer systems 107 configured with executable instructions and may be implemented as code (e.g., executable instructions, one or more computer programs, or one or more applications) executing collectively on one or more processors 109, by hardware or combinations thereof. The code may be stored on a computer-readable storage medium, for example, in the form of a computer program comprising a plurality of instructions executable by one or more processors 109. The computer-readable storage medium may be non-transitory.

Figure 2A:
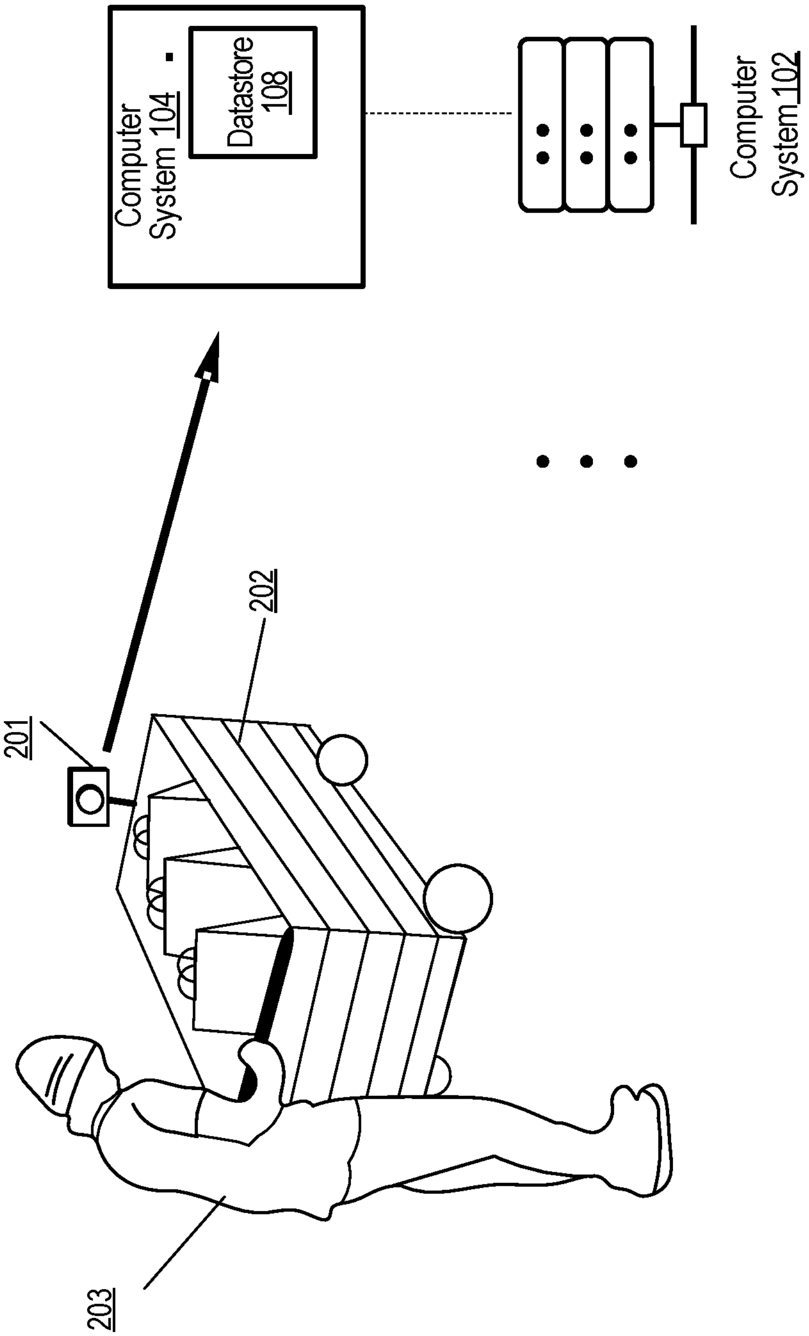
FIG. 2A illustrates an example of collecting data by observing how items are placed in containers when carts are used to retrieve such items from storage locations, according to an embodiment of the present disclosure.

FIG. 2A illustrates an example of collecting data 110 by observing how items are placed in containers when carts 202 are used to retrieve such items from their storage locations according to an embodiment of the present disclosure. In an example, data 110 related to the arrangement of items 101 in a container 107 may be collected by observing resources 203 performing item 101 arrangement tasks. Using a camera 201 installed in a cart 202 or other method of observation, a resource 203 using the cart 202 may be observed arranging a set of items 101 in a container 107 to fulfill a customer order 103. Data 110 related to the arrangement process (e.g., sequence the items 101 are arranged in a container 107) and item data 110 related to item features 701 (e.g., item identifiers 301, item description, item properties such as weights, dimensions, etc.) may be collected and stored in a datastore 108.

The data 110 can be used as training data 111 to train a machine learning model 105 to generate scores 106. In particular, the data 110 can indicate sequences of items 101 being arranged in containers 107 and features 701 of the items. The sequences can be processed (e.g., by a manual process or an automated process using object detection algorithms) to determine the relative ranking of items 101 for arranging the items 101 in the container 107 and, as such score the items 101 according to the ranking. These determined scores 106 can be used as ground truth labels in the training data 111. The item features 701 can then be used as input to the machine learning model 105 during the training, where the machine learning model 105 may predict the scores 106 based on such features 701.

Figure 2B:
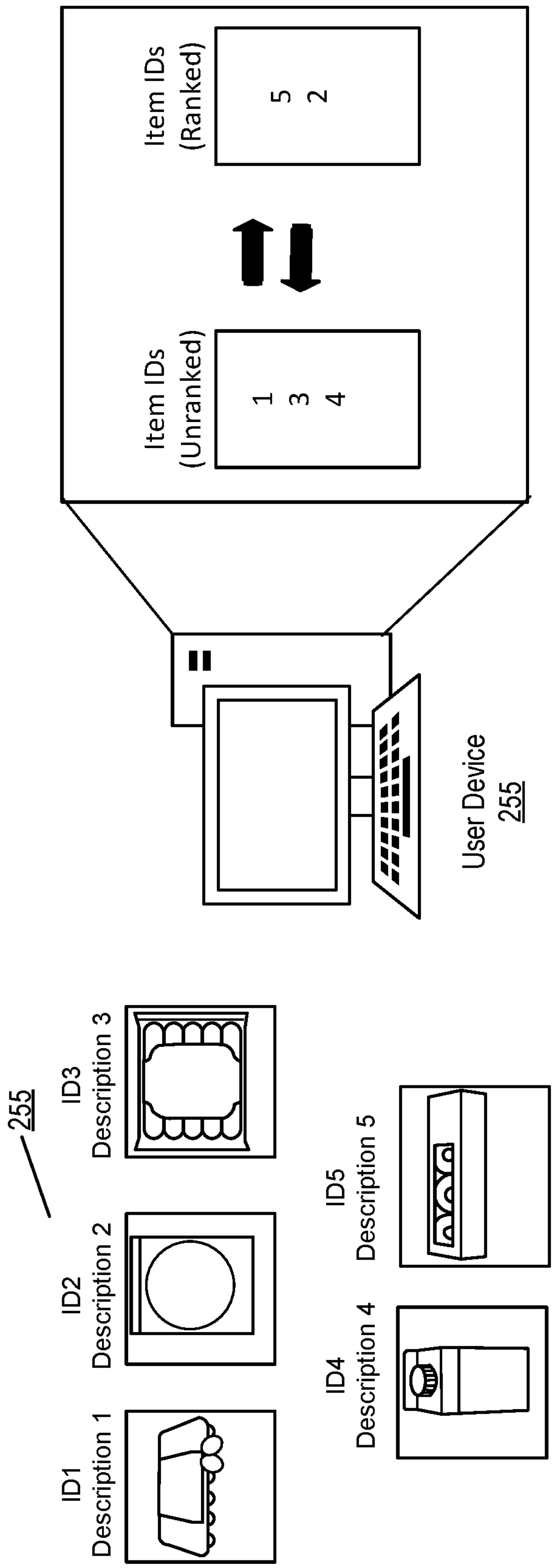
FIG. 2B illustrates an example of collecting data by observing based on user input via a graphical user interface, according to an embodiment of the present disclosure.

FIG. 2B illustrates an example of collecting data by observing based on user input via a graphical user interface, according to an embodiment of the present disclosure. A virtual bagging system can include a user device 250 that retrieves item information 255 from a data store and present such item information 255 in the graphical user interface (including textual descriptions of the items, images thereof, and item identifiers). An application executed by the user device 255 can present the item information 255 and allow user input (e.g., via a keyboard, a mouse, or some other input device) to rank the items. In the illustration of FIG. 2B, information about five items are presented. Item identifiers of the five items are presented in the graphical user interface, initially in a list of unranked item identifiers. User input is received and ranks item identifier "5" higher than item identifier "2," thereby indicating that the fifth item would be placed in a container before the second item. Of course, additional user input can be received to rank some or all of these five items and possibly other items. The application can then output data indicating the ranking, where this data can include a sequence of the item identifiers corresponding to the ranking and, possibly, various pieces of the item information (e.g., the textual description and/or images). This data can be included in the training data 111.

Figure 3:
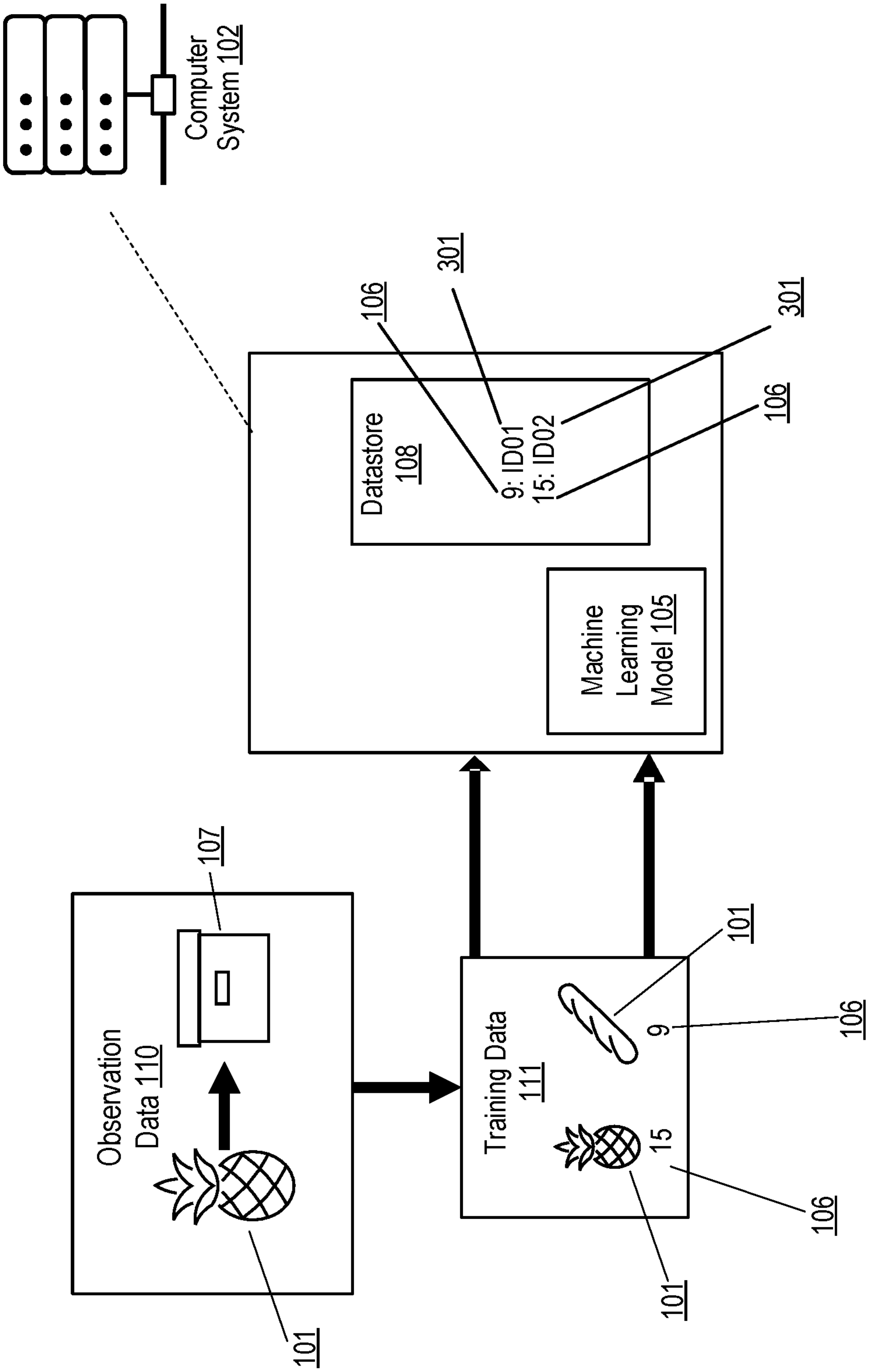
FIG. 3 illustrates an example of training a machine learning model to generate item scores, according to an embodiment of the present disclosure.

FIG. 3 illustrates an example of training a machine learning model 105 to generate item scores 106 according to an embodiment of the present disclosure. In an example, the data 110 collected from observing resources 203 may be used to train a machine learning model 105 to output item scores 106. Initially, item scores 106 may be determined for a subset of items 101 observed being arranged by an resources 201 completing an order fulfillment tasks. Once trained on at least a subset of items 101, the machine learning model 105 can be used to generate scores 106 for all items 101, including items 101 not involved in the training.

As explained herein above, the training data 111 can include item data 110 describing features 701 of items 101 and scores 106 generated for these items 101 and set as ground truth labels. In an example, the machine learning model 105 is implemented as an artificial neural network, such as a convolutional neural network. In this example, the training can be iterative, whereby the item data 110 (or a portion thereof) can be input to the machine learning model 105 that then generates scores 106 based on this input. The scores 106 can be compared to the ground truth scores to determine prediction errors. A loss function can be defined based on the prediction error. The training can update parameters of the machine learning model 105 (e.g., weights of inter-node connections) via backpropagation techniques to minimize the loss function (e.g., minimize the prediction error).

Once trained, and as illustrated in FIG. 3, the computer system 102 can input, for each item 101, the corresponding item data to the machine learning model 105. In turn, this model 105 outputs a score 106 for the item 101. The computer system 102 can then store the score 106 in association with an identifier 301 of the item in the datastore 108.

Figure 4:
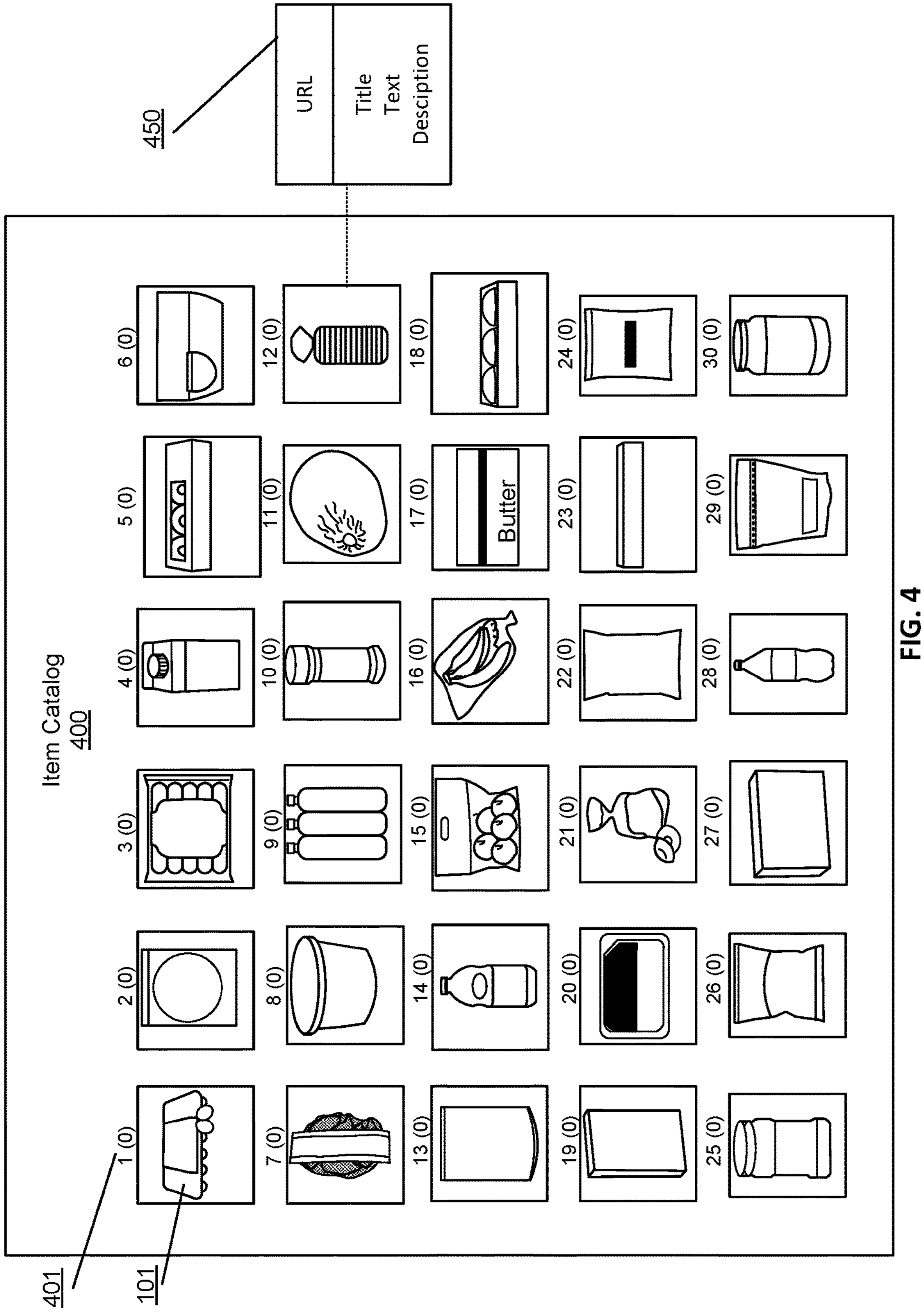
FIG. 4 illustrates an example catalog of items, according to an embodiment of the present disclosure.

FIG. 4 illustrates an example catalog 400 of items 101 according to an embodiment of the present disclosure. In an example, the catalog 400 of items 101 can represent information about items 101 that may be ordered and fulfilled from a fulfillment center. Such information can be stored in a datastore 108 and can include, among other things, one or more images and textual description of each item. The textual description of an item can describe various properties of the item including, for example, title, weight, fragility, type of packaging for shipping the item, type of item (e.g., liquid or not), dimensions, and other properties. Item information about an item (including text and/or images) can be presented in a web page 450 about the item. Each of the items 101 identified in the catalog 400 can be also scored per the techniques of the present disclosures. For example, information from the catalog 400 about the item 101 can be input to a machine learning model 105 to generate the score 106.

The item scores 106 may be stored in the catalog 400 (e.g., as another information field in the datastore 108). Alternatively, or additionally, the item scores 106 can be stored in a different datastore 108 in association with item identifiers 301 and/or other item features 701.

In the illustration of FIG. 4, prior to being scored by means of a trained machine learning model 105, all items 101 may have a default score 401. In an example, a default score 401 can be a mean (or other statistical measure) of known scores. As depicted, prior to being associated with an item score 106, all items 101 may be assigned a default score 401. In the absence of any information, all items 101 in the catalog 400 may be associated with the same or similar item score 106. As item scores 106 are determined for items 101 in the catalog 400, the default values 401 may be replaced with the updated item score 106. Furthermore, as new items 101 are inducted, initial default scores 401 may be generated and associated with the new items 101 prior.

Figure 5:
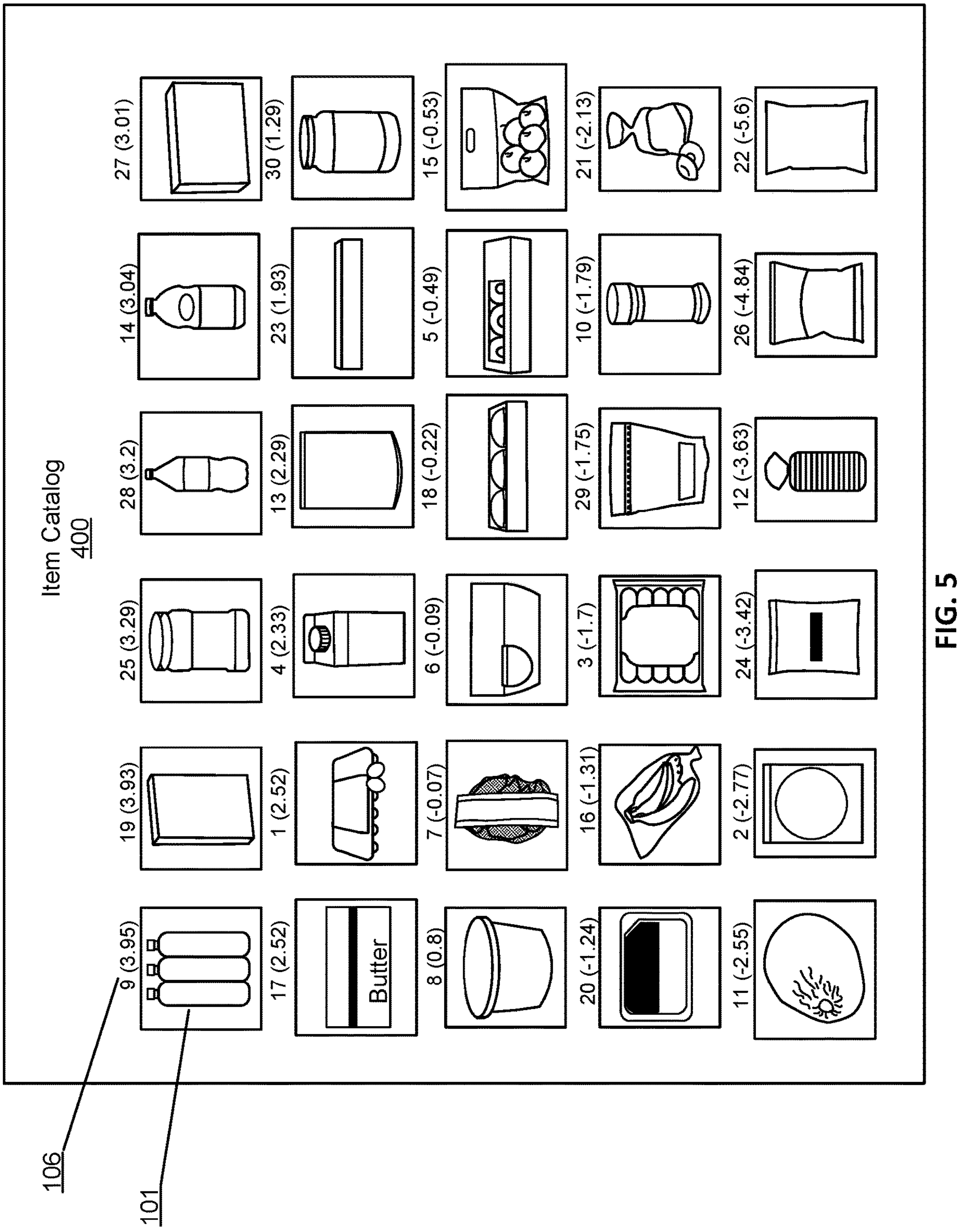
FIG. 5 illustrates an example catalog of items where item scores have been associated with each item, according to an embodiment of the present disclosure.

FIG. 5 illustrates an example catalog 400 of items 101 where item scores 106 have been associated with each item 101 according to an embodiment of the present disclosure. This catalog 400 may be the same as the one described in FIG. 4 except that the items 101 have now been scored. The scoring may be an initial scoring 106 (e.g., following an automated process or a manual process) that is then used to train a machine learning model 105. Additionally, or alternatively, the scoring may be by means of the trained machine learning model 105. In an example, as item scores 106 are generated using the machine learning model 105, the catalog 400 of items 101 may update to reflect the new item scores 106. Through continued observation and collection of data 110 indicating the sequence of arranging items 101 in a container 107 for delivery, the item scores 106 may be iteratively improved (e.g., by continuously training or refining the machine learning model), reflecting the increasing size of the dataset. The item scores 106 may initially vary greatly between each update of the scores 106; however, the scores 106 may gradually converge to steady state numbers as more data is collected. The item scores 106 may be stored in a datastore 108 and associated with an item identifier 301 for later user, as further illustrated in FIG. 9.

Figure 6:
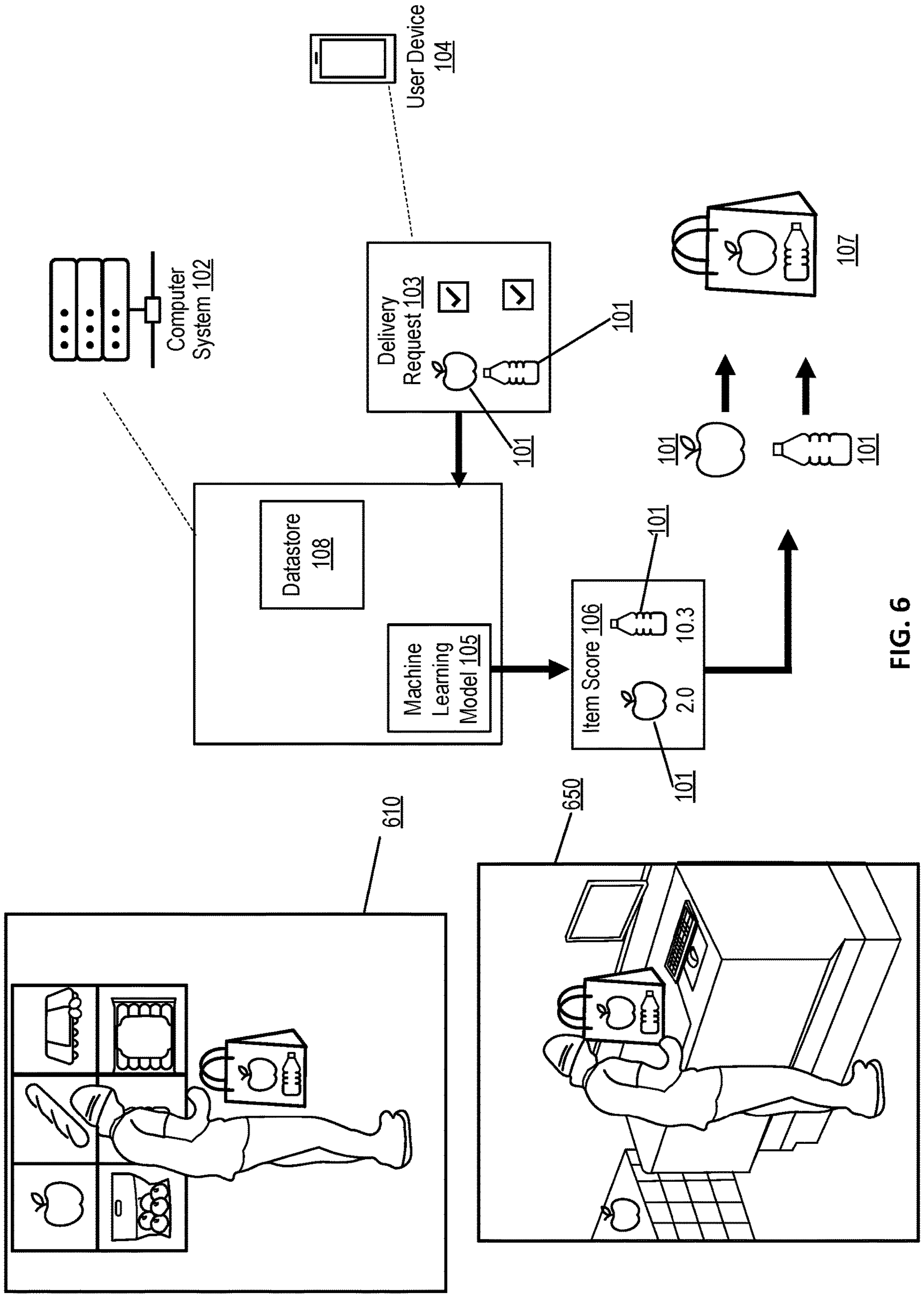
FIG. 6 illustrates an example of employing a machine learning model to arrange items in a container, according to an embodiment of the present disclosure.

FIG. 6 illustrates an example of employing a machine learning model 105 to arrange items 101 in a container 107 according to an embodiment of the present disclosure. Once trained, a machine learning model 105 can generate item scores 106 such that item scores 106 may guide the handling of individual orders 103. In an example, a computer system 102 receives a delivery request 103 from a user device 104, the delivery request 103 including a set of items 101 being ordered. The computer system 102 may determine item identifiers 301 of the item 101 from the delivery request 103. Next, the computer system 102 can look up a catalog 400 (e.g., a datastore 108 storing item information) to determine item features 701 corresponding to these items 101. An input including the item features 701 can be generated and provided to a machine learning model 105 that then can generate an output in the form of item scores 106 for each item 101 in the delivery 103. Alternatively, the computer system 102 may use the item identifiers 301 to look up a catalog 400 that already includes the item scores 106 and then determine the item scores 106 as a search result. In both examples, the item scores 106 indicate a ranking sequence may guide the arrangement of the items 101. In some embodiments, a ranking sequence guiding items 101 of a higher score 106 to be arranged in a container 107 before items 101 of a lower score 106 may be implemented. Based on the sequence of arrangement of items 101 in the container 107, damage to the items 101 during transit can be minimized, for example, heavy items 101 like cans of food are less likely to be arranged on top of delicate items 101 such as bread preventing the likelihood of delicate/fragile items being damaged before reaching the customer.

Different uses of the item scores 106 are possible. In one example 610, the sequence of arranging the items 101 in one or more containers 107 is generated based on these scores 106, where the higher an item 101 is scored, the earlier the arrangement of the item 101 is in a container 107 relative to lower scored items 101. The sequence can be sent to a resource (e.g., as a set of instructions presented on a user interface in the case of a human resource, or as a set of instruction executable by a processor in the case of an automated resource) that retrieves the items 101 from their respective storage locations according to the sequence. When an item is retrieved, the resource (human or automated) places the item in a container 107 before retrieving a next item. As such, the items would be placed in the container(s) 107 according to the sequence and without the need to re-arrange them once placed in the container(s) 107. In another example 650, items are retrieved and presented to a workstation according to the sequence. A resource (human or automated) at the workstation places the items in container(s) 107 in the order of their presentation. Because the presentation follows the sequence, the items are placed in the container(s) 107 according to the sequence and without the need to re-arrangement them once placed in the container(s) 107.

In yet another use example (not illustrated in FIG. 6), a workstation can include a user interface, such as a graphical user interface, that presents the sequence and identifies the items 101. In this use case, additional controls can be provided. For example, a camera and a light projector can be operated. The camera can generate image data showing the items 101 to be packed. Such image data can be processed to identify the items 101. Based on the sequence, the light projector can be controlled to identify an item 101 to be packed next according to the sequence. The image data can be continuously processed to detect if this item 101 is packed in the correct order. If so, the next item 101 can be highlighted by the light projector, and so on. Otherwise, an alert can be generated to correct the packing.

In another use case (not illustrated in FIG. 6), the computer system 102 can generate, based on the sequence, instructions that control robots 1002 to pick items 101 before moving them to the workstation. For example, a first robot 1002 is instructed to pick and deliver a first item 101 to the workstation before a second robot 1002 or the same first robot 1002 is instructed to pick and deliver a second item 101 to the workstation based on the scores 106 of these two items 101.

Figure 7:
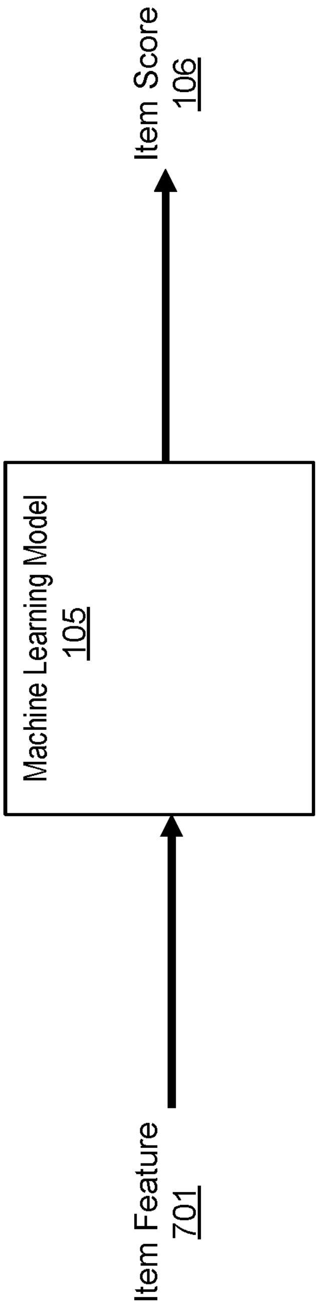
FIG. 7 illustrates a machine learning model for dynamic item score generation based on item features, according to an embodiment of the present disclosure.

FIG. 7 illustrates a machine learning model 105 for dynamic item score 106 generation based on item features 701 according to an embodiment of the present disclosure. The machine learning model 105 may be trained with observation data 110 in the form of item features 701, as described herein above. In an example, features 701 of the items 101 in a delivery request 103, such as weight, dimensions, shape, packaging type, item images, textual description, etc. may be converted into inputs for the machine learning model 105. Such features 701 can be available from a catalog 400 (e.g., a datastore 108 storing information about the items 101). The input can include the features 701 or such features 701 can be used to generated embeddings (e.g., by another machine learning model, such as a BERT model) and the embeddings can be included in the input. Using the input, the machine learning model 105 may output item scores 106. Because a machine learning model 105 is used, the item scores 106 may take into consideration the varying features 701 of the items 101, salient and inherent correlations between these features, thereby allowing the generating of a ranking of items 101 reflecting the unique aspects of the items 101 and the nuanced decisions that are made during the arrangement process.

Figure 8:
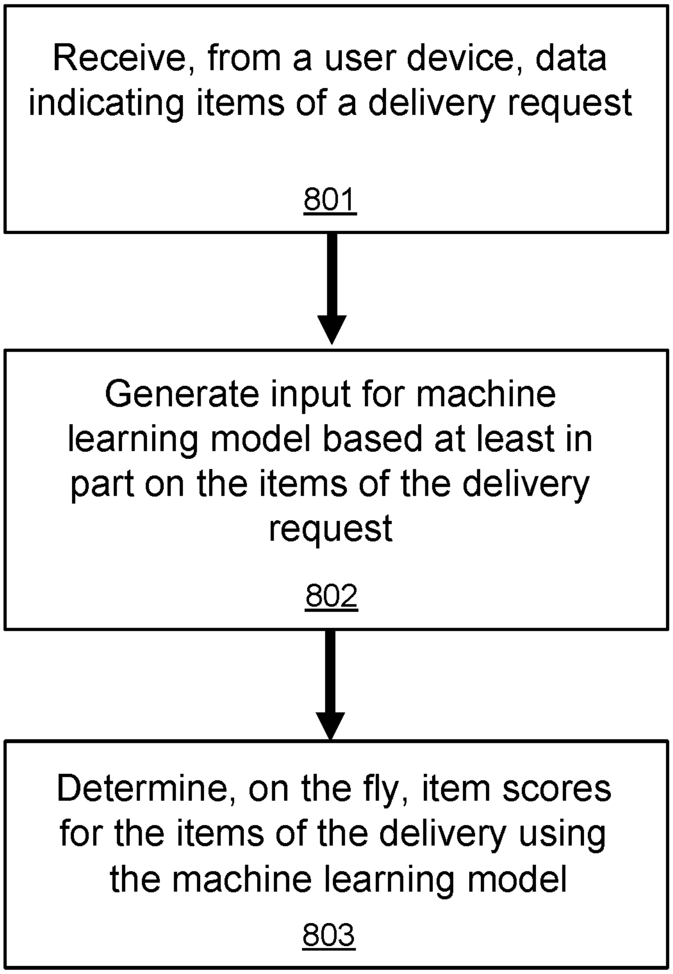
FIG. 8 illustrates an example of generating item scores using a machine learning model on the fly, according to an embodiment of the present disclosure.

FIG. 8 illustrates an example of generating item scores 106 using a machine learning model 105 on the fly according to an embodiment of the present disclosure. In an example, item scores 106 may be generated on the fly when a new delivery request 103 is received. New item scores 106 may be generated for the items 101 of a delivery request 103 each time a delivery request 103 is received. For example, upon receipt of a request 103 an input may be generated for the machine learning model 105 based on the items 101 of the delivery request 103. The machine learning model 105 may then deliver an output of item scores 106 associated with the items 101 of the current delivery request 103 and used to guide handling of the items 101 for that order 103. Subsequent delivery requests 103 may then repeat the process of generating item scores 106 on the fly in perpetuity.

In an example, the flow includes operation 801, where the computer system 102 receives, from a user device 104, data indicating items 101 of a delivery request 103. For instance, the data includes item identifiers 301. The flow also includes operation 802, where the computer system 102 generates an input for a machine learning model 105 based at least in part on the items 101 of the delivery request 103. For instance, the computer system 102 looks up a catalog 400 of items 101 using the item identifiers 301 to determine item features 701. The item features 701 can be included in the input or these features 701 can be used to generate embeddings that are then included in the input. The flow also includes operation 803, where the computer system 102 determines, on the fly, item scores 106 for the items 101 of the delivery request 103 using the machine learning model 105. For example, the input is provided to the machine learning model 105. The output includes the item scores 106.

Figure 9:
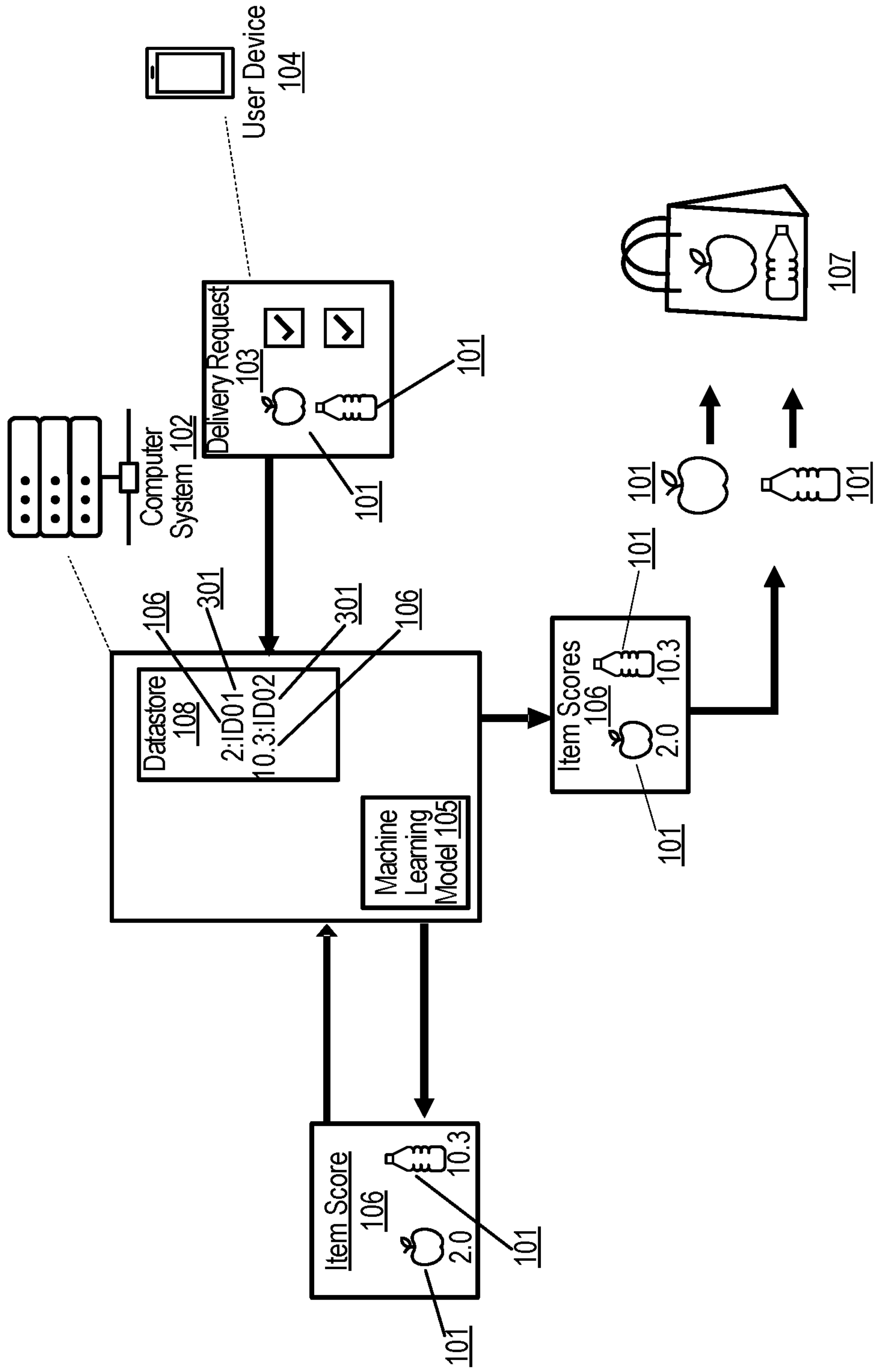
FIG. 9 illustrates an example of determining an item score of an item by looking up such a score in a datastore, according to an embodiment of the present disclosure.

FIG. 9 illustrates an example of determining an item score 106 of the item 101 by looking up such a score 106 in a datastore 108 according to an embodiment of the present disclosure. In one example, the datastore 108 can store item scores 106 in association with item identifiers 301. Additionally, the datastore 108 may also store item information such that this datastore 108 can be used as a catalog 400 of items 101, where the catalog 400 includes various types of information about each item 100 including its item score 106. In an example, a machine learning model 105 may be used to generate item scores 106 for items 101 in a delivery request 103. These item scores 106 may then be associated with an item identifier 301 and stored in a datastore 108 for efficient retrieval later. Thus, if a subsequent delivery request 103 includes an item 101 which has an item score 106 already associated with it, the item score 106 may be retrieved from the datastore 108 by looking up the corresponding item identification 301. Therefore, an item score 106 may only need to be generated by a machine learning model 105 once, which reduces the computing load required to implement the use of the item scores 106.

Figure 10:
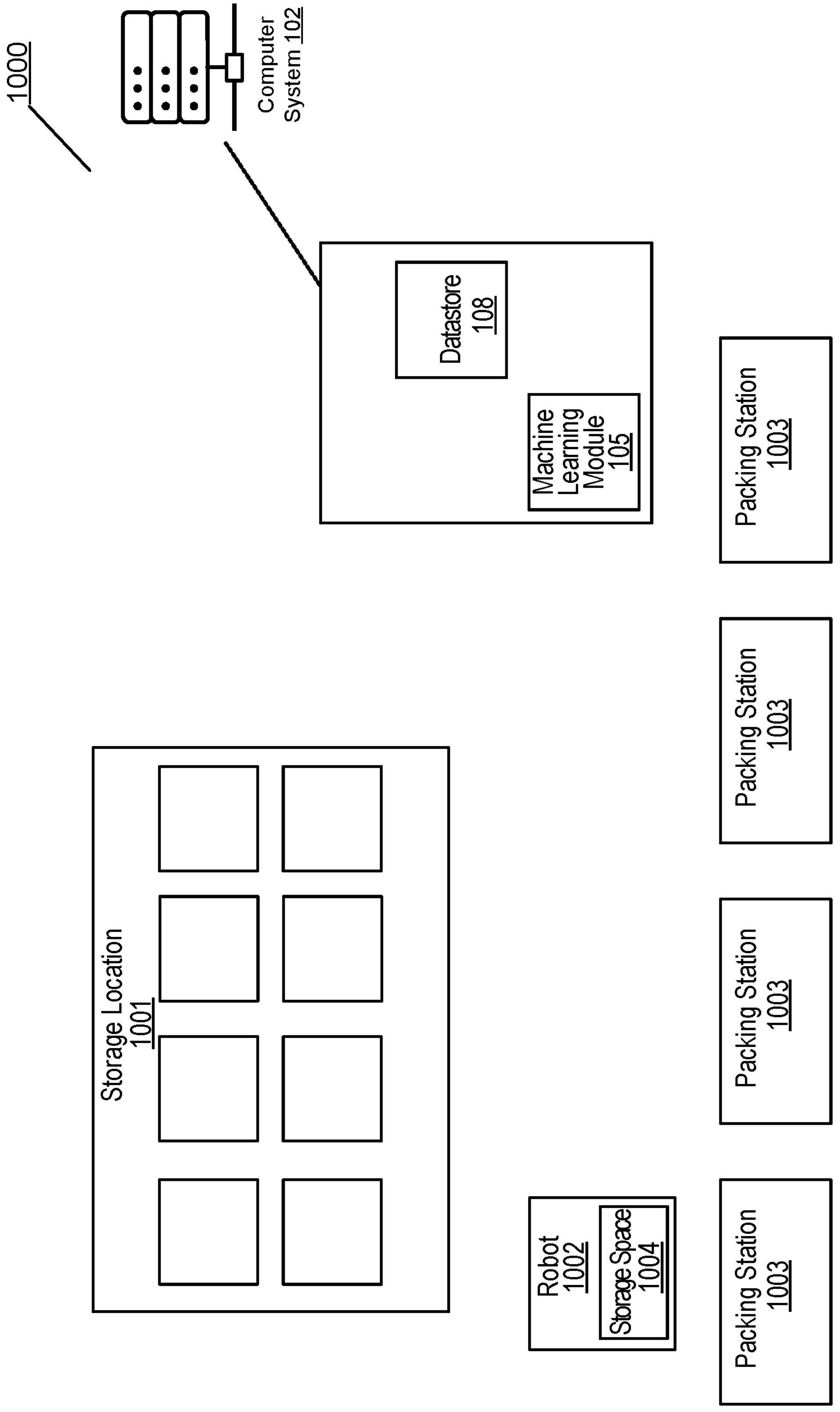
FIG. 10 illustrates an example layout of a storage facility, according to an embodiment of the present disclosure.

FIG. 10 illustrates an example layout of a storage facility 1000 according to an embodiment of the present disclosure. As previously mentioned, one illustrative use case is to employ the generated item scores 106 to guide the retrieval of items 101 from storage locations 1001 in a storage facility 1000. Once an order 103 for items 101 stored in a storage facility 1000 is received and the item scores 106 for the items 101 are generated using a machine learning model 105, the resulting item scores 105 may be used to direct mobile robots 1002 to retrieve items 101 in a particular sequence based at least in part on the item scores 106.

For example, in the case where an order 103 of a first and second item 101 is received, item scores 106 may be generated (on the fly or pre-generated) and associated with the items 101. The item scores 106 may then be implemented to guide a mobile robot 1002 to retrieve the first item 101 before retrieving the second item 101 because the item score 106 associated with the first item 101 is higher than the item score 106 associated second item 101. In particular, a computer system 102 can maintain a datastore 108 indicating a first storage location 1001 of the first item 101 and a second storage location 1001 of the second item 101. The item scores 106 may indicate that the first item 101 is to be arranged in a container 107 at a packing station 1003 before the second item 101 is arranged in the container 107 at the packing station 1003. The computer system 102 can instruct a robot 1002 to move to the first storage location 1001, retrieve the first item 101, and deliver the first item 101 to the packing station 1003 before doing the same for the second item 101. Or the computer system 102 can instruct a robot 1002 to move to the second storage location 1001 first, retrieve and store the second item 101 in a first storage space 1004 of the robot 1002, then move to the first storage location 1001, retrieve and store the first item 101 in a second storage space 1004 (or the same first storage space 1004) of the robot 1002. Thereafter, the instructions can indicate that the robot 1002 is to move to the packing station 1003, deliver the first item 101 first then the second item 101 such that these items 101 are arranged at the packing station 1003 according to the sequence indicated by the item scores 106.

Figure 11:
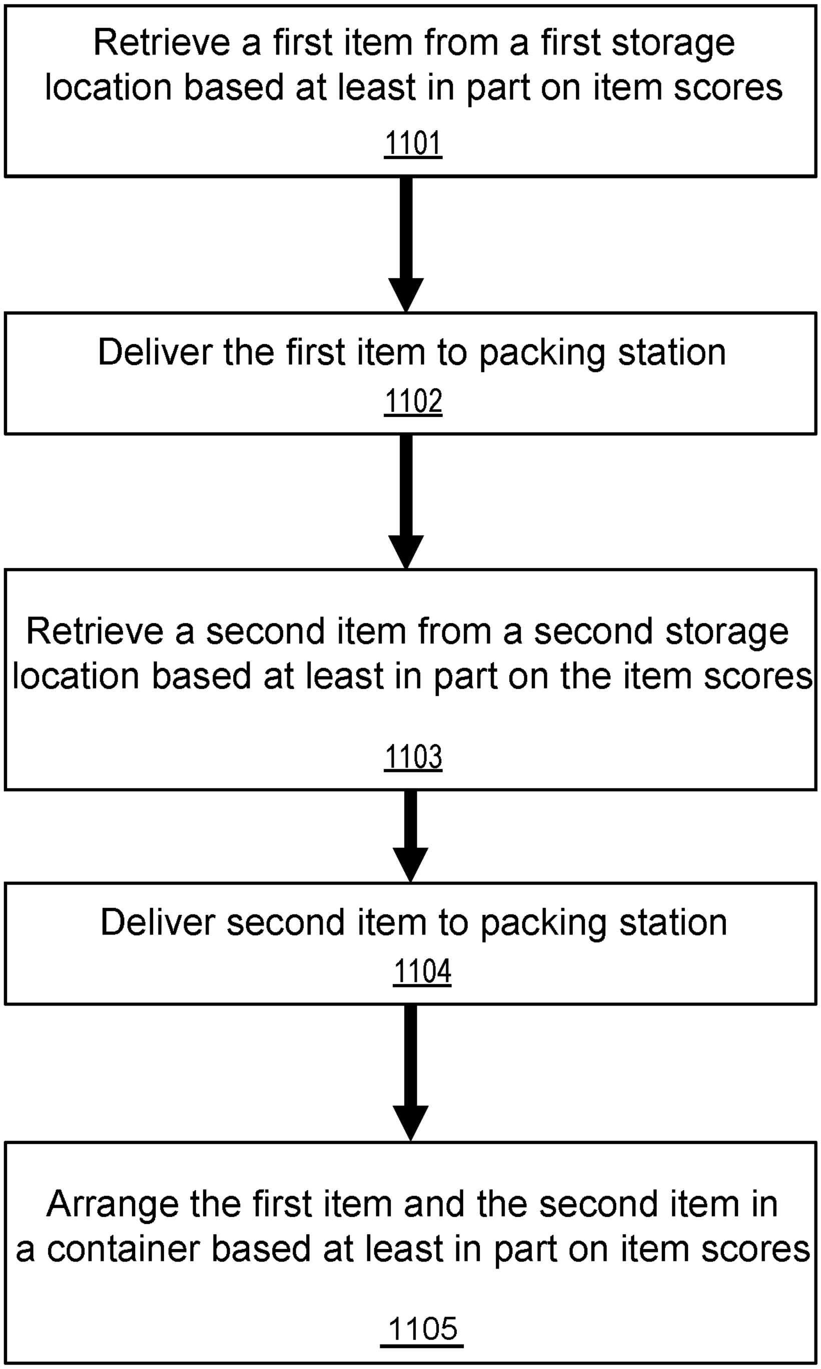
FIG. 11 illustrates an example of implementing item scores to guide mobile robots to pick up and drop off items for packing, according to an embodiment of the present disclosure.

FIG. 11 illustrates an example of implementing item scores 106 to guide mobile robots 1002 to pick up and drop off items 101 for packing according to an embodiment of the present disclosure. In some embodiments, the retrieval sequence based at least in part on the item scores 106 may vary. In an example, based at least in part on the item scores 106 of the items 101 of a delivery request 103, a mobile robot 1002 may be employed to retrieve items 101 from storage locations 1001 in a storage facility 1000. The mobile robot 1002 may be guided to retrieve the first item 101 in the order 103 and bring it to a station 1003 for arrangement in a container 107 for delivery. The mobile robot 1002 may subsequently be guided to retrieve the next item 101 in the order 103 to present at the station 1003 for arrangement. In this manner, organization may be imposed in the delivery fulfillment process during the item 101 retrieval stage. Inducing a ranked order through a sequenced presentation of items 101 to be arranged in a container 107.

In an example, the flow includes operation 1101, where a computer system 102 instructs a robot 1002 to retrieve a first item 101 from a first storage location 1001 based at least in part on item scores 106. For instance, the first item 101 is associated with a first item score 106 that is larger than a second item score 106 of a second item 101. As such, the first item 101 is to be arranged in a container 107 before arranging the second item 101 in the container 107. Accordingly, the robot 1002 can move to the first storage location 1001 and retrieve the first item 101. The flow includes operation 1102, where the computer system 102 causes the first item 101 to be delivered to the packing station 1003. For example, the instructions also identify the location of the packing station 1003 to the robot 1002 and instructs it to deliver the first item 101 to that location upon retrieval. The robot 1002 then executes the instructions, moves from the first storage location 1001 of the first item 101 to the location of the packing station 1003, and delivers the first item 101 to the packing station 1003. The flow includes operation 1103, where a computer system 102 instructs the same robot 1002 or a different robot 1002 to retrieve the second item 101 from the second storage location 1001 based at least in part on item scores 106. Accordingly, the robot 1002 can move to the second storage location 1001 and retrieve the second item 101. The flow includes operation 1104, where the computer system 102 causes the second item 101 to be delivered to the packing station 1003. For example, the instructions also identify the location of the packing station 1003 to the robot 1002 and instructs it to deliver the second item 101 to that location upon retrieval. The robot 1002 then executes the instructions, moves from the second storage location 1001 of the second item 101 to the location of the packing station 1003, and delivers the second item 101 to the packing station 1003. In the example flow, although operations are illustrated in a sequential manner, some or all of these operations can be performed in parallel. For example, if two robots 1002 are used, the instructions can be sent thereto in parallel or in any order. The timing of delivering the items 101 to the packing station 1003 becomes relevant, whereby the first robot 1002 may deliver the first item 101 prior to the second robot 1002 based on the item scores 106. The flow includes operation 1105, where the computer system 102 instructs the packing station 1003 to arrange the first item 101 and the second item 101 in a container 107 based at least in part on the item scores 106. For example, the packing station 1003 can include controllable end effectors and robotic arms to move the first item 101 and the second item 101 into the container 107 according to the sequence in which the two items 101 are to be arranged. Additionally, or alternatively, the packing station 1003 can include a user interface that presents the sequence and/or camera and light projector to assist manual labor in the arranging of the two items 101 in the container 107. Arranging the items 101 includes placing the items 101 in the container 107 according to the sequence and avoiding the re-arrangement of the items 101 once placed in the container 107.

Figure 12:
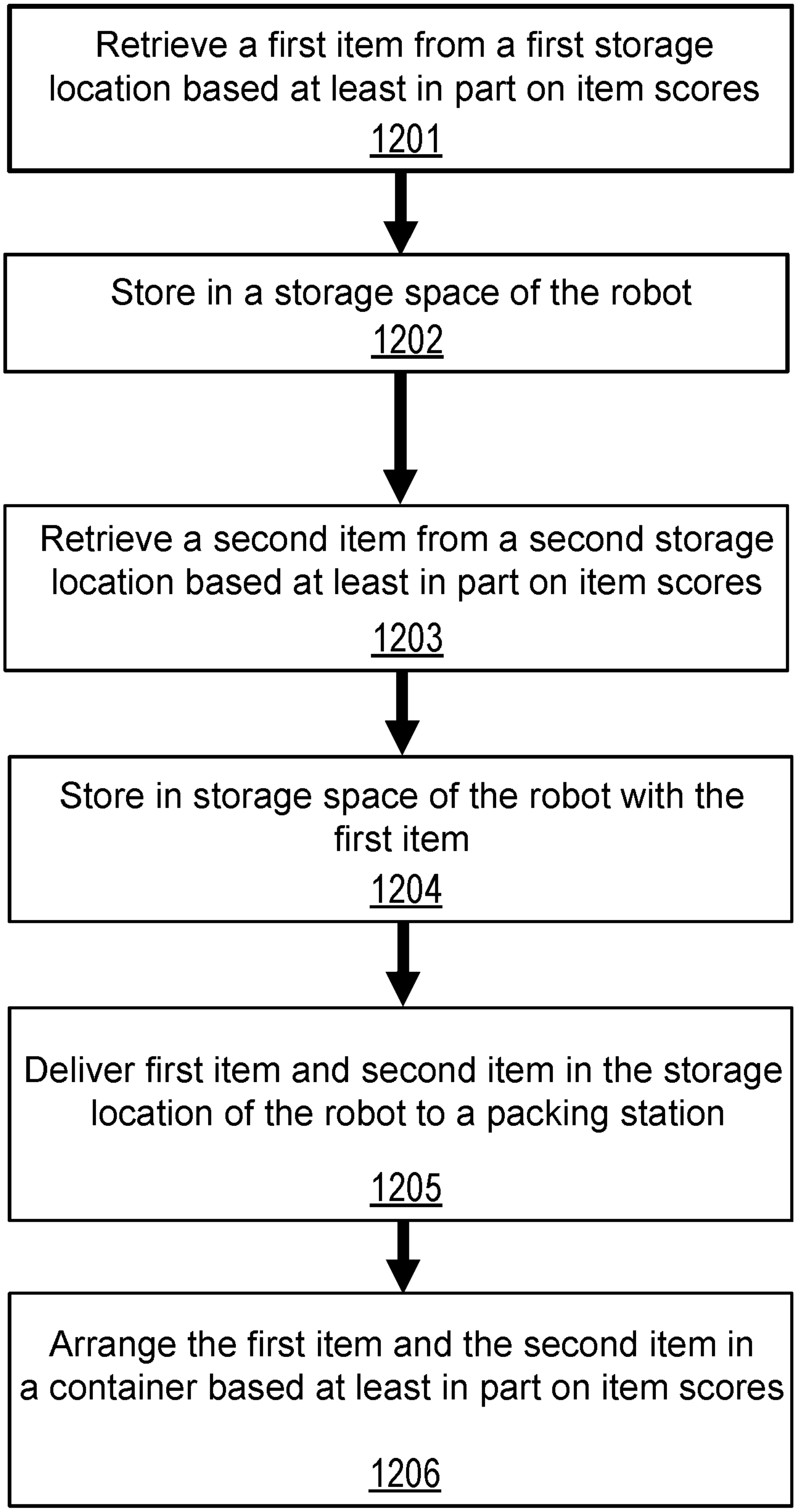
FIG. 12 illustrates another example of implementing item scores to guide a mobile robot to pick up and drop off items for packing, according to an embodiment of the present disclosure.

FIG. 12 illustrates another example of implementing item scores 106 to guide a mobile robot 1002 to pick up and drop off items 101 for packing according to an embodiment of the present disclosure. In an example, based at least in part on the item scores 106 for the items 101 of a delivery request 103, a mobile robot 1002 may be guided to retrieve all items 101 in the delivery order 103 and arrange them in a storage space 1004 of the robot 1002 before presenting the items 101 at a packing station 1003 to fulfill the order 103. For example, based at least in part on a first item score 106 for a first item 101, a mobile robot 1002 is guided to retrieve the first item 101 from a storage location 1001 and arrange the item 101 in a storage space 1004 of the robot 1002. Then, based at least in part on the second item score 106 for a second item 101, the mobile robot 1002 may proceed to retrieve the second item 101 and arrange the item 101 in the storage space 1004 of the robot 1002, where the storage space 1004 still comprises the first item 101. Finally, once all the items 101 for an order 103 are retrieved from storage locations 1001, the mobile robot 1002 may bring the storage space 1004 of the robot 1002 with the order items 101 to a packing station 1003 for final arrangement in a container 107 to fulfill the delivery request 103.

In an example, the flow includes operation 1201, where a computer system 102 instructs a robot 1002 to retrieve a first item 101 from a first storage location 1001 based at least in part on item scores 106. For instance, the first item 101 is associated with a first item score 106 that is larger than a second item score 106 of a second item 101. As such, the first item 101 is to be arranged in a container 107 before arranging the second item 101 in the container 107. Accordingly, the robot 1002 can move to the first storage location 1001 and retrieve the first item 101. The flow includes operation 1202, where the computer system 102 causes the robot 1002 to store the first item 101 in a storage space 1004 of the robot 1002). For example, the instructions also instruct the robot 1002 to temporarily store the first item 101 until other item(s) 101 are also retrieved. The flow includes operation 1203, where the computer system 102 causes the robot 1002 to retrieve the second item 101 from the second storage location 1001 based at least in part on item scores 106. For instance, the instructions also identify the second storage location 1001 and indicates that this storage location 1001 is to be visited for the retrieval of the second item 101 only after the first item 101 is retrieved. The robot 1002 then executes the instructions, moves from the first storage location 1001 of the first item 101 to the second storage location 1001 of the second item 101, and retrieves the second item 101. The flow includes operation 1204, where the computer system 102 causes the robot 1002 to store the second item 101 in the storage space 1004 with the first item 101 (e.g., in the same or a different storage space 1004 of the robot 1002). For example, the instructions also instruct the robot 1002 to temporarily store the second item 101 until other item(s) 101 are also retrieved. The flow includes operation 1205, where the computer system 102 causes the first item 101 and second item 101 to be delivered to the packing station 1003. For example, the instructions also identify the location of the packing station 1003 to the robot 1002 and instructs it to deliver, to the location of the packing station 1003, the item(s) 101 after all or at least a subset of all items 101 destined to the packing station 1003 are retrieved. The robot 1002 then executes the instructions, moves from the second storage location 1001 of the second item 101 (or any subsequent storage location 1001) to the location of the packing station 1003, and delivers the items 101 to the packing station 1003. In the example flow, although operations are illustrated in connection with two items 101, more than two items 101 can be retrieved and delivered to the packing station 1003. Further, the flow of FIG. 12 can be used in conjunction with the flow of FIG. 11 to control multiple robots 1002 that may deliver items 101 for fulfilling the same delivery request 103 to the packing station 1003. The flow includes operation 1206, where the computer system 102 instructs the packing station 1003 to arrange the first item 101 and the second item 101 in a container 107 based at least in part on the item scores 106. For example, the packing station 1003 can include controllable end effectors and robotic arms to move the first item 101 and the second item 101 into the container 107 according to the sequence in which the two items 101 are to be arranged. Additionally, or alternatively, the packing station 1003 can include a user interface that presents the sequence and/or camera and light projector to assist manual labor in the arranging of the two items 101 in the container 107.

Figure 13:
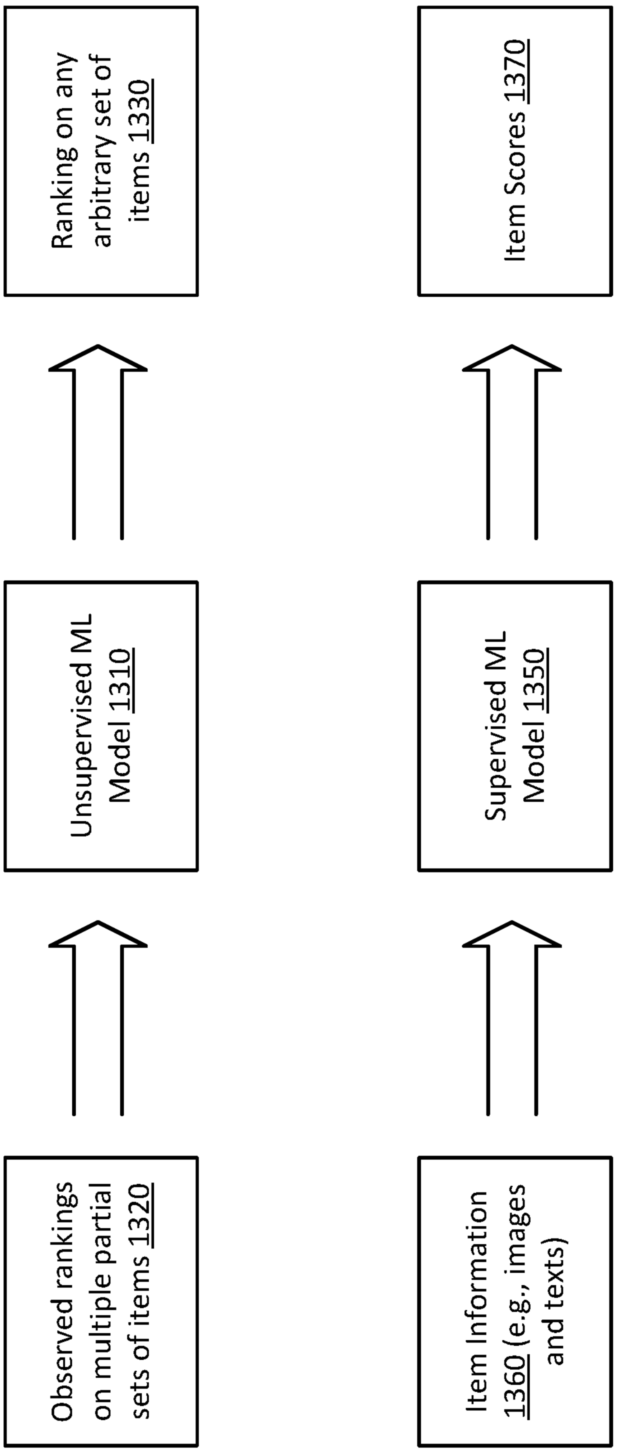
FIG. 13 illustrates example machine learning models for dynamic item score generation based on item features, according to an embodiment of the present disclosure.

FIG. 13 illustrates example machine learning models for dynamic item score generation based on item features according to an embodiment of the present disclosure. As illustrated, an unsupervised machine learning model 1310 learns to rank 1330 any arbitrary set of items, based observed ranks on other sets items. The unsupervised ML model is parametrized by scores (one for each item) that are learned using rankings 1320 gathered from observing sequences of placing items in containers. For example, the training data includes identifiers of items in a first set of items and the sequence of such items being placed in a container(s). The order of an item in the sequence corresponds to a ranking of the item. Such training data can be generated using algorithms applied to image and/or video data as described in FIG. 2A or using an application that receives user input as described in FIG. 2B. In both cases, the unsupervised training model is trained to learn item scores. The item scores are then used to generate a predicted rankings for the set of items. A difference between the observed rankings and the predicted rankings can be an error, which may be expressed in a loss function. The training can be iterative for this set and across other sets of items, whereby the loss function is minimized. Once trained, a set of item identifiers may be input to the unsupervised machine learning model 1310 that then outputs their item scores and/or their predicted rankings. However, this model 1310 can only rank items that have been seen at least once in the training data.

As further illustrated, a supervised machine learning model 1350 can also be used. The supervised machine learning model 1350 learns an embedding of item information 1360 (such as images and/or textual descriptions) to scores 1370. At inference, the item information 1360 can be for any item (even ones that have not been previously observed). The training data for this model 1350 can be generated by the unsupervised model 1310 for a finite number of items (for which observations exist). The training can include, for a set of items, inputting the corresponding item information to the supervised machine learning model 1350 that then predicts their item scores and using these scores to generate rankings for a comparison to rankings generated by the unsupervised machine learning model 1310. A ranking difference between can be an error, which may be expressed in a loss function. The training can be iterative for this set and across other sets of items, whereby the loss function is minimized. Once trained, item information for any set of items (previously observed or unobserved) may be input to the supervised machine learning model 1350 that then outputs their item scores 1370.

The unsupervised machine learning model 1310 can be used standalone model, but it cannot extrapolate. In other words, this model 1310 cannot rank a new, unseen item (with respect to other items). In comparison, the supervised machine learning model 1350 can the capability to extrapolate, by generating a score for such new items given their corresponding item information. This model 1350 is trained in a supervised setting, by retrieving scores from the unsupervised machine learning model 1310.

Different use cases are possible at inference. In one example, for a set of previously observed items, the unsupervised machine learning model 1310 may be used to generate item scores. In particular, item identifiers of these items may be input to the unsupervised machine learning model 1310 that then output their item scores. In another example, for a set of previously observed and/or unobserved items, the supervised machine learning model 1350 may be used to generate item scores. In particular, item information of these items may be input to the supervised machine learning model 1350 that then output their item scores.

Figure 14:
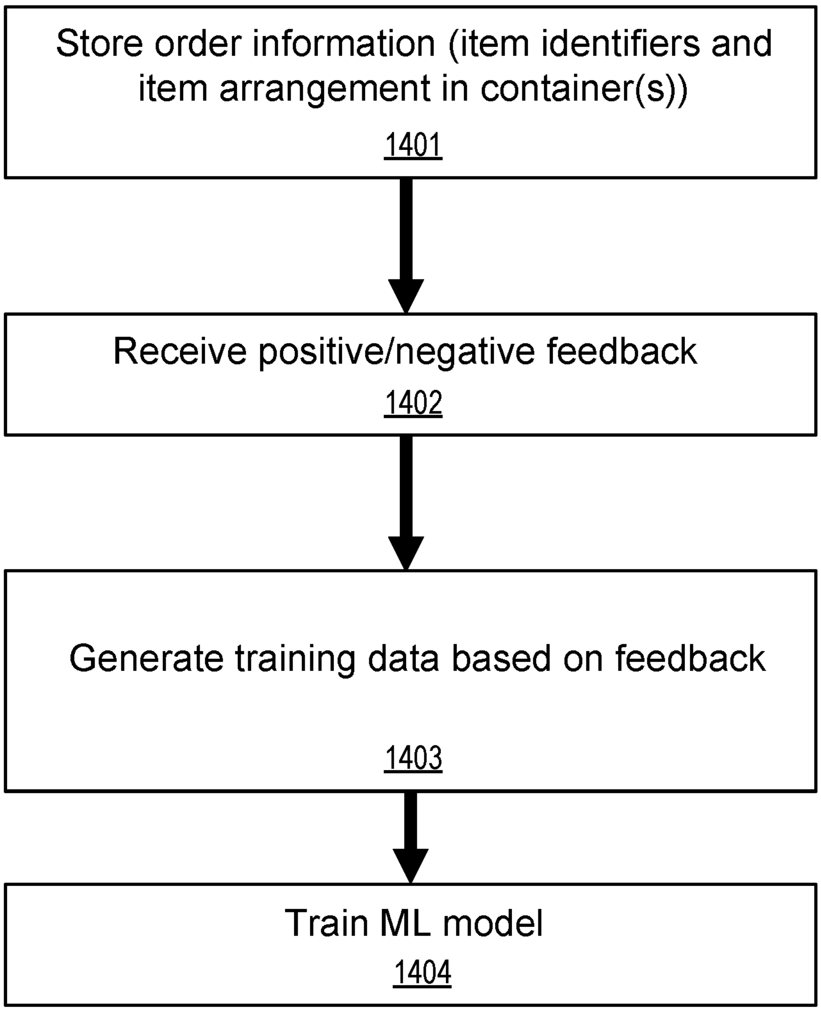
FIG. 14 illustrates an example of implementing a feedback loop for further training a machine learning model, according to an embodiment of the present disclosure.

FIG. 14 illustrates an example of implementing a feedback loop for further training a machine learning model according to an embodiment of the present disclosure. In an example, order information is stored 1401. In particular, a user device may request a set of items to be delivered. A fulfillment process can be implemented to deliver the items. As part of this process, the items may be placed in a container(s). Information that identifies the items and the order in which the items were placed in a container(s) (e.g., the sequence per container) can be stored as part of the order information. A positive and/or negative feedback related to the fulfillment of the requested items may be determined 1402. For example, negative feedback can be submitted via the user device indicating that at least one of the items was damaged Positive feedback can be alternatively submitted via the user device indicating that no items were damaged, or such positive feedback can be implicitly deducted when no negative feedback is received. In another example, negative feedback can the submitted by the associate if the items are presented to the associate in a seemingly incorrect sequence for arranging in a container. For example, the fulfillment process can involve the associated bagging the items. A user device may be available to the associate and can present a planned sequence to use for the bagging. The associate may edit the sequence via the user device and may use this sequence instead, thereby placing the items in a container by deviating from the planned sequence. The edit can correspond to negative feedback, whereby the change to the planned sequence is tracked (e.g., the order of an item in the sequence changes, and this change can be tracked). Training data can be generated 1403 based on the feedback from such sources. For example, the order information can be associated with the feedback. In particular, the sequence of placing the items can be positively (in case of positive feedback or no feedback) or negatively (in case of negative feedback) be scored. For instance, if an item was placed second in a container and negative feedback was received indicating that this item was damaged (or could be potentially damaged), the sequence can be labeled, where the label can indicate that the item should not have been placed second in the container (or in between the relevant other items). Item information of the different items can be retrieved using the item identifiers and such information along with the sequence and the negative and/or positive scores can be included in training data. A machine learning model can be trained 1404 using the training data. In one example, the machine learning model was previously trained and was used to generate the sequence for the fulfillment of the items. In this example, the machine learning model can be further trained using the training data. In another example, the training data is used in the first instance of training the machine learning model. In both examples, the machine learning model can be an unsupervised machine learning model that can then be used to generate additional training data for a supervised machine learning model.

Figure 15:
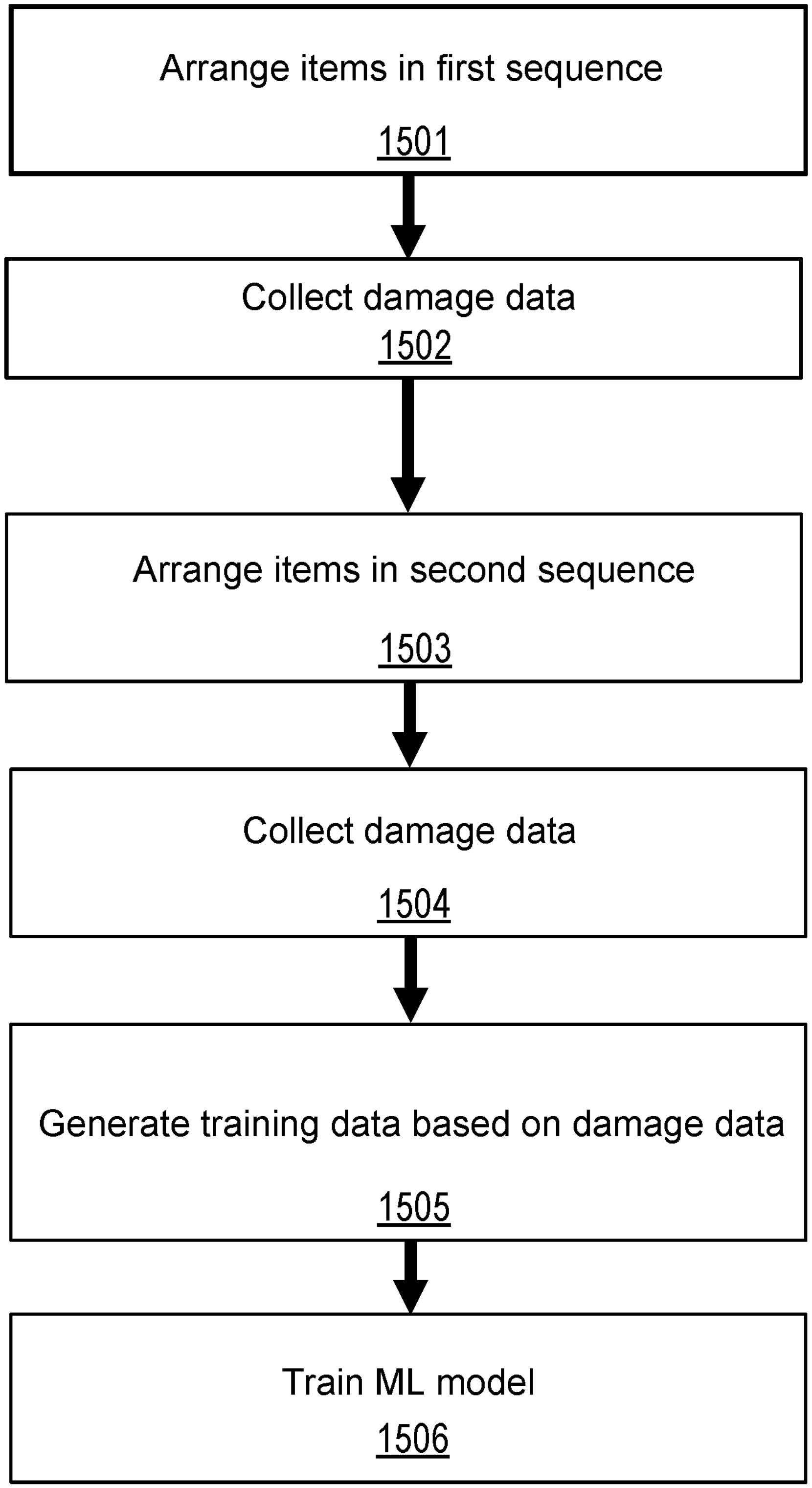
FIG. 15 illustrates another example of implementing experimental sequencing to generate training data for a machine learning model, according to an embodiment of the present disclosure.

FIG. 15 illustrates another example of implementing experimental sequencing to generate training data for a machine learning model according to an embodiment of the present disclosure. Here, rather than collecting feedback, experimental data can be generated and used to train a machine learning model. In particular, a set of items can be used and can be placed 1501 in a container according to first sequence. Damage data can then be collected 1502 to indicate whether any of such items was damaged, the identifiers of the items, and the sequence of the items. Another set of the same items can be used and can be placed 1503 in a same type of container according to a second sequence, where this second sequence is different from the first one. Damage data can also here be collected 1504. These operations of changing the sequence to be used can be repeated multiple times and can, likewise, be repeated for other item sets to collect damage data. Training data can be generated 1505 based on the collected damage data. For example, a sequence of placing items can be positively (in case when the corresponding damage data indicates that no damage occurred) or negatively (in case when the corresponding damage data indicates that a damage occurred) be scored. For instance, if an item was placed second in a container and the collected damage data indicates that this item was damaged, the sequence can be labeled, where the label can indicate that the item should not have been placed second in the container (or in between the relevant other items). Item information of the different items can be retrieved using the item identifiers and such information along with the sequences and the damage scores can be included in training data. A machine learning model can be trained 1506 using the training data. In one example, the machine learning model was previously trained and was used to generate the sequence for the fulfillment of the items. In this example, the machine learning model can be further trained using the training data. In another example, the training data is used in the first instance of training the machine learning model. In both examples, the machine learning model can be an unsupervised machine learning model that can then be used to generate additional training data for a supervised machine learning model.

Figure 16:
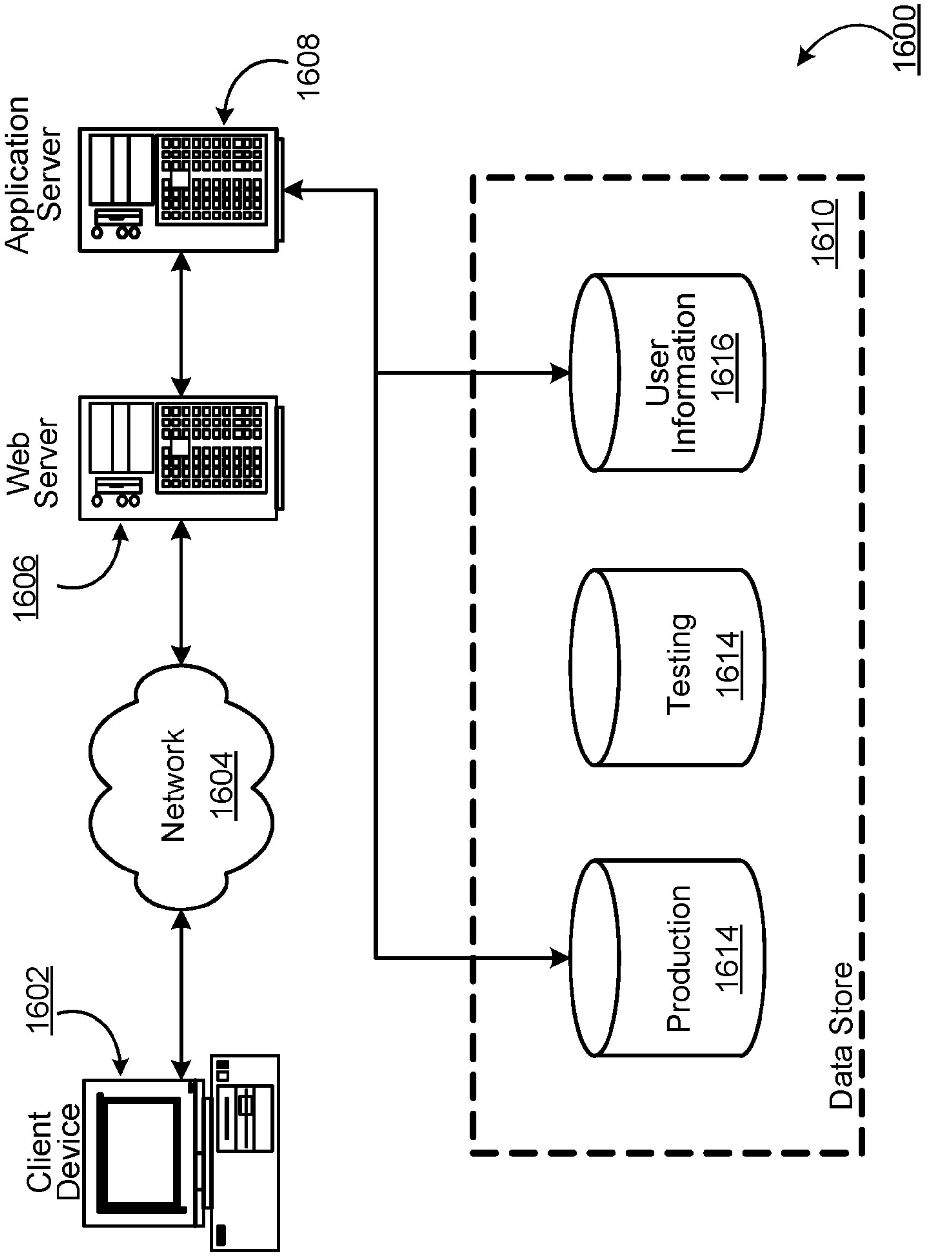
FIG. 16 illustrates aspects of an example environment 1300 for implementing aspects in accordance with various embodiments.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for arranging items in a container comprising:

one or more processors; and one or more memories storing instructions that, upon execution by the one or more processors, configure the system to:

collect, for a first order requesting a delivery of first items to a location, first data indicating a first sequence for arranging the first items in a first container for the first order;

generate, for an item of the first items and based at least in part on the first sequence, an item score indicating a ranking for arranging the item in the first container, the ranking being relative to other items of the first order;

store the item score in a datastore comprising item identifiers and scores, wherein an item identifier of the item is associated with the item score;

train, based at least in part on the scores stored in the datastore, a machine learning model to generate item scores;

receive, from a user device, second data indicating a second order requesting at least a first item and a second item to be delivered;

determine for the first item a first item score and for the second item a second item score, the first item score and the second item score being generated by the machine learning model based at least in part on the second order, one or more features of the first item and the second item, the scores stored in the datastore, and observation data associated with previous sequences of items placed in containers, wherein the first item score and the second item score indicate that the first item is to be arranged in a second container prior to the second item being arranged in the second container for the second order;

responsive to a difference between the first item score and an item score in the datastore associated with the first item, or between the second item score and an item score in the datastore associated with the second item, exceeding a threshold value, updating the item score in the datastore for the corresponding item with the determined first item score or second item score;

generate a second sequence of item retrieval based at least in part on the first item score and the second item score, the second sequence indicating that the first item is to be arranged in the second container prior to the second item being arranged in the second container for the second order;

cause, based at least in part on the second sequence, at least one mobile robot to retrieve the first item from a first storage space of a facility prior to retrieving the second item from a second storage space of the facility; and cause, based at least in part on the first item score and the second item score, the first item to be arranged in the second container prior to the second item for the second order.

2. The system of claim 1, wherein the one or more memories store further instructions that, upon execution by the one or more processors, configure the system to:

generate, prior to receiving the second data, an input based at least in part on the one or more features of the first item and the second item, the scores stored in the datastore, and observation data associated with the previous sequences of items placed in containers;

determine an output of the machine learning model based at least in part on the input, the output comprising the first item score and the second item score;

store, in the datastore, the first item score and the second item score;

determine that the second data indicates the second order of the first item and the second item is requested; and retrieve for the second order, the first item score based at least in part on a lookup that includes a first item identifier of the first item.

3. The system of claim 1, wherein the one or more memories store further instructions that, upon execution by the one or more processors, configure the system to:

collect feedback data indicating at least one of: whether a delivered container includes a damaged item or whether arranging items in a second container deviated from a planned sequence;

associate the feedback data with the items in the second container or with a sequence used to arrange the damaged item in the delivered container;

generate training data based at least in part on the feedback data and the sequence; and train the machine learning model based at least in part on the training data.

4. The system of claim 1, wherein the one or more memories store further instructions that, upon execution by the one or more processors, configure the system to:

cause a set of mobile robots to retrieve the first item and the second item;

generate the second sequence based at least in part on the first item score and the second item score; and cause the set of mobile robots to deliver the first item and the second item to a station based at least in part on the second sequence.

5. A method comprising:

receiving, from a user device, first data indicating that a first item and a second item are to be arranged in a first container;

determining for the first item a first item score and for the second item a second item score, the first item score and the second item score being generated by a machine learning model based at least in part on one or more features of the first item and the second item, scores stored in a datastore, and observation data associated with previous sequences of items placed in containers, wherein the first item score and the second item score indicate that the first item is to be arranged in the first container prior to the second item being arranged in the first container;

responsive to a difference between the first item score and an item score in the datastore associated with the first item or between the second item score and an item score in the datastore associated with the second item, exceeding a threshold value, updating the item score in the datastore for the corresponding item with the determined first item score or second item score;

generating a sequence of item retrieval based at least in part on the first item score and the second item score, the sequence indicating that the first item is to be arranged in the first container prior to the second item being arranged in the first container;

causing, based at least in part on the sequence of item retrieval, at least one mobile robot to retrieve the first item from one or more storage spaces prior to retrieving the second item from the one or more storage spaces; and causing, based at least in part on the first item score and the second item score, the first item to be arranged in the first container prior to the second item.

6. The method of claim 5, further comprising:

collecting, prior to receiving the first data and for an order requesting delivery of first items to a location, second data indicating a first sequence for arranging the first items in a second container, the first items including an item;

generating, for the item and based at least in part on the first sequence, a score indicating a ranking for arranging the item in the second container, the ranking being relative to other items of the order;

storing the score in the datastore that comprise item identifiers and the scores and that associates an item identifier of the item with the score; and training, based at least in part on the scores stored in the datastore, the machine learning model to generate the first item score and the second item score.

7. The method of claim 5, further comprising:

generating, prior to receiving the first data, an input based at least in part on the one or more features of the first item and the second item;

determining an output of the machine learning model based at least in part on the input, the output comprising the first item score and the second item score;

storing, in the datastore, the first item score and the second item score;

determining that the first data indicates that delivery of the first item and the second item is requested; and retrieving, for the delivery, the first item score based at least in part on a lookup that includes a first item identifier of the first item.

8. The method of claim 6, further comprising:

assigning, prior to collecting the second data, a default score for the first item indicating that the first item has not been previously scored.

9. The method of claim 5, wherein the one or more features include at least one of dimensions, weight, shape, packaging type, item images or textual description.

10. The method of claim 5, further comprising:

collecting feedback data indicating at least one of: whether a delivered container includes a damaged item or whether arranging items in a second container deviated from a planned sequence;

associating the feedback data with the items in the second container or with a sequence used to arrange the damaged item in the delivered container;

generating training data based at least in part on the feedback data and the sequence; and training the machine learning model based at least in part on the training data.

11. The method of claim 10, further comprising:

causing the mobile robot to deliver the first item to a station prior to retrieving the second item;

causing the mobile robot to deliver the second item to the station after delivery of the first item to the station;

generating a second sequence of item arrangement based at least in part on the first item score and the second item score; and causing the first item and the second item to be arranged in the first container based at least in part on the second sequence.

12. The method of claim 10, further comprising:

causing a set of mobile robots to retrieve the first item and the second item;

generating a sequence of item arrangement based at least in part on the first item score and the second item score; and causing the set of mobile robots to deliver the first item and the second item to a station based at least in part on the sequence of item arrangement.

13. One or more non-transitory computer-readable storage media storing instructions that, upon execution by a system, cause the system to perform operations comprising:

receiving, from a user device, first data indicating that a first item and a second item are to be arranged in a first container;

determining for the first item a first item score and for the second item a second item score, the first item score and the second item score being generated by a machine learning model based at least in part on one or more features of the first item and the second item, scores stored in a datastore, and observation data associated with previous sequences of items placed in containers, wherein the first item score and the second item score indicate that the first item is to be arranged in the first container prior to the second item being arranged in the first container;

responsive to a difference between the first item score and an item score in the datastore associated with the first item or between the second item score and an item score in the datastore associated with the second item, exceeding a threshold value, updating the item score in the datastore for the corresponding item with the determined first item score or second item score;

generating a sequence of item retrieval based at least in part on the first item score and the second item score, for sequence indicating that the first item is to be arranged in the first container prior to the second item being arranged in the first container;

causing, based at least in part on the sequence of item retrieval, at least one mobile robot to retrieve the first item from one or more storage spaces prior to retrieving the second item from the one or more storage spaces; and causing, based at least in part on the first item score and the second item score, the first item to be arranged in the first container prior to the second item.

14. The one or more non-transitory computer-readable storage media of claim 13, wherein the operations further comprise:

collecting, prior to receiving the first data and for a first order requesting a first delivery of first items, second data indicating a first sequence for arranging the first items in a second container;

collecting, prior to receiving the first data and for a second order requesting a second delivery of second items, third data indicating a second sequence for arranging the second items in a third container; and training, based at least in part on the second data and the third data, the machine learning model to generate rankings of items in an item set, the item set including one or more items of the first items and one or more items of the second items.

15. The one or more non-transitory computer-readable storage media of claim 14, wherein the operations further comprise:

generating, after the training, an input to the machine learning model, wherein the input includes a first item identifier of the first item and a second item identifier of the second item; and determining an output of the machine learning model based at least in part on the input, wherein the output indicates the first item score and the second item score.

16. The one or more non-transitory computer-readable storage media of claim 13, wherein the machine learning model is a first machine learning model, and wherein the operations further comprise:

collecting, prior to receiving the first data and for a first order requesting a first delivery of first items, second data indicating a first sequence for arranging the first items in a second container;

collecting, prior to receiving the first data and for a second order requesting a second delivery of second items, third data indicating a second sequence for arranging the second items in a third container;

training, based at least in part on the second data and the third data, a second machine learning model to generate rankings of items in an item set, the item set including one or more items of the first items and one or more items of the second items;

generating training data that includes item information and the rankings; and training the first machine learning model based at least in part on the training data.

17. The one or more non-transitory computer-readable storage media of claim 16, wherein the operations further comprise:

generating, after the training of the first machine learning model, an input to the first machine learning model, wherein the input includes first item information about the first item and second item information about the second item; and determining an output of the first machine learning model based at least in part on the input, wherein the output indicates the first item score and the second item score.

18. The one or more non-transitory computer-readable storage media of claim 13, wherein the operations further comprise:

collecting feedback data indicating at least one of: whether a delivered container includes a damaged item or whether arranging items in a second container deviated from a planned sequence;

associating the feedback data with a sequence used to arrange the damaged item in the delivered container or the items in the second container;

generating training data based at least in part on the feedback data and the sequence; and training the machine learning model based at least in part on the training data.

19. The one or more non-transitory computer-readable storage media of claim 13, wherein the operations further comprise:

arranging a set of items in a second container according to a sequence;

collecting damage data indicating whether the second container includes one or more damaged items;

associating the damage data with the sequence;

generating training data based at least in part on the damage data and the sequence; and training the machine learning model based at least in part on the training data.

20. The one or more non-transitory computer-readable storage media of claim 13, wherein the first data indicates a request for a delivery of the first item and the second item, wherein the operations further comprise:

generating, after the first data is received, an input to the machine learning model, the input including at least one of first item information or a first item identifier of the first item and at least one of second item information or a second item identifier of the second item, the first item information and the second item information including at least the one or more features of the first item and the second item; and determining an output of the machine learning model based at least in part on the input, the output indicating the first item score and the second item score.

* * * * *